United States Patent
Töpfer et al.

(10) Patent No.: US 10,278,403 B2
(45) Date of Patent: May 7, 2019

(54) DIRECT HANGING LINE

(71) Applicant: Poly-clip System GmbH & Co. KG, Hattersheim (DE)

(72) Inventors: Klaus Töpfer, Büttelborn (DE); Olaf Bienert, Waldems (DE)

(73) Assignee: Poly-clip System GmbH & Co. KG, Hattersheim (DE)

( * ) Notice: Subject to any disclaimer, the term of this patent is extended or adjusted under 35 U.S.C. 154(b) by 0 days.

(21) Appl. No.: 15/586,014

(22) Filed: May 3, 2017

(65) Prior Publication Data

US 2017/0318826 A1    Nov. 9, 2017

(30) Foreign Application Priority Data

May 4, 2016   (EP) ..................................... 16168444

(51) Int. Cl.
  *A22C 15/00*   (2006.01)
  *A22C 11/02*   (2006.01)
  *A22C 11/12*   (2006.01)

(52) U.S. Cl.
  CPC ............ *A22C 15/001* (2013.01); *A22C 11/02* (2013.01); *A22C 11/125* (2013.01); *A22C 11/127* (2013.01); *A22C 15/00* (2013.01); *A22C 15/002* (2013.01)

(58) Field of Classification Search
  CPC ....... A22C 11/00; A22C 11/005; A22C 11/10; A22C 15/00; A22C 15/001; A22C 15/007
  USPC ........................ 452/30–32, 35–37, 46–48, 51
  See application file for complete search history.

(56) References Cited

U.S. PATENT DOCUMENTS

| | | | | |
|---|---|---|---|---|
| 6,419,077 B1 * | 7/2002 | White | ................. | A22C 15/002 198/433 |
| 7,255,638 B2 * | 8/2007 | Stimpfl | ................ | A22C 15/001 452/32 |
| 7,824,250 B2 * | 11/2010 | Topfer | ................. | B65G 59/062 452/51 |
| 8,113,924 B2 * | 2/2012 | Nakamura | ........... | A22C 15/001 452/32 |
| 8,308,533 B2 * | 11/2012 | Haslacher | ............... | A22C 11/00 452/32 |

(Continued)

FOREIGN PATENT DOCUMENTS

EP    1891859 A2    2/2008
EP    2008522 A1    12/2008

(Continued)

OTHER PUBLICATIONS

Extended European search report issued in corresponding European Application No. 16168444.4 dated Oct. 28, 2016 (11 pages).

*Primary Examiner* — Richard T Price, Jr.
(74) *Attorney, Agent, or Firm* — Fitch, Even, Tabin & Flannery LLP

(57) ABSTRACT

The present invention relates to a system and a method for producing sausage-shaped products, like sausages, containing a flowable filling material in a tubular or bag-shaped packaging casing and a suspension element, like a suspension loop. The system includes a clipping machine for producing the sausage-shaped products, a discharge device for discharging the sausage-shaped products out of the clipping machine and a feeding device for feeding a rod-like element into a loading position in which the sausage-shaped products are stored on the rod-like element by the discharge device.

15 Claims, 17 Drawing Sheets

(56) References Cited

U.S. PATENT DOCUMENTS

| | | | | |
|---|---|---|---|---|
| 8,342,318 B2* | 1/2013 | Knodel | ............... | A22C 15/001 |
| | | | | 198/680 |
| 8,366,523 B2* | 2/2013 | Topfer | ................. | A22C 11/125 |
| | | | | 452/31 |
| 8,545,293 B2* | 10/2013 | Lendenmann | ....... | A22C 15/001 |
| | | | | 452/51 |
| 8,556,687 B2* | 10/2013 | Meyrahn | ............ | A22C 17/0073 |
| | | | | 452/31 |
| 8,708,782 B2* | 4/2014 | Kessler | ............... | A22C 15/001 |
| | | | | 452/51 |
| 8,790,166 B2* | 7/2014 | Sbalzarini | ............ | A22C 11/105 |
| | | | | 452/51 |
| 8,808,067 B2* | 8/2014 | Waldstadt | .............. | A22C 11/00 |
| | | | | 452/51 |
| 8,870,058 B2* | 10/2014 | Ebert | .................. | A22C 11/127 |
| | | | | 235/375 |
| 8,939,819 B2* | 1/2015 | Pitzer | .................. | A22C 15/001 |
| | | | | 452/49 |

FOREIGN PATENT DOCUMENTS

| | | | |
|---|---|---|---|
| EP | 2572585 | A1 | 3/2013 |
| FR | 2965455 | A1 | 4/2012 |
| WO | 03/076276 | A2 | 9/2003 |

\* cited by examiner

DIRECT HANGING LINE

CROSS-REFERENCE TO RELATED APPLICATION

The present application claims the benefit of priority of European Patent Application No. 16168444.4 filed May 4, 2016, the contents of which are incorporated herein by reference in their entirety.

FIELD

The present invention relates to a system for producing sausage-shaped products each of which contain a flowable filling material in a tubular or bag-shaped packaging casing and a suspension element. The system includes a clipping machine for producing the sausage-shaped products, a discharge device for discharging the sausage-shaped products out of the clipping machine and a feeding device for feeding a rod-like element into a loading position.

BACKGROUND OF THE INVENTION

In the production of sausage-shaped products, like sausages, a filling material is fed by a filling machine through a filling tube of the clipping machine into a tubular casing material. After a predetermined volume of filling material has been filled into said tubular casing material, the clipping machine closes the back end of the sausage-shaped product via a closing means, like closure clips, which are attached by respective closing tools. A suspension element, like a suspension loop, may also be attached to said back end of said sausage-shaped product, enabling the sausage-shaped product to be hung up e.g. on a smoking rod or the like. Afterwards, the sausage-shaped product just produced, is separated from the remaining casing material by a knife or the like of a cutting device of the clipping machine and is transferred out of the clipping machine to a handling device for the next treatment step or a storage device by a respective discharge device.

For storing the sausage-shaped product on a smoking rod provided in a loading position, the suspension loop is grabbed by a transfer device which removes the sausage-shaped product from the discharge device, and which may include a conveyor chain having suspension hooks. The sausage-shaped product, while hanging on the suspension hook, is than guided with its suspension loop over the smoking rod and placed on a desired storage place on the smoking rod. The filled smoking rod is moved out of the loading position and an empty smoking rod is placed to be filled next.

From EP patent application 2 008 522, a hanging line is known, in which sausages are carried out of a clipping machine and their loops are guided directly onto a smoking rod. In this known device, the sausage bodies are transferred out of the clipping machine by a discharge conveyor, transferred onto a second conveyor and moved along the smoking rod while laying on said second conveyor.

A further known hanging line for storing sausages is disclosed EP patent application 1 891 859. The sausages which are produced in a known clipping machine include a suspension loop that is guided along a rod-shaped element or sword. A chain conveyor is partially arranged above the sword and engages the loops by means of hooks arranged at the conveyor chain such that the respective sausage hangs on said hook by its loop. The loop caught by a hook is spread and guided over the smoking rod. A release mechanism causes the hook to releases the loop at a desired place on the smoking rod. After a predefined number of sausages are placed on the smoking rod, the filled smoking rod is replaced by an empty smoking rod.

These known sausage production and handling devices include a number of sub-devices for transferring the sausages from the clipping machine to their storage places on the smoking rod. Moreover, these devices are of complex construction and necessitate a complex control, e.g. for controlling the synchronized movement of the different conveyor devices or the defined placement of the sausages on the smoking rod.

Thus, it is an object of the present invention to overcome the above mentioned drawbacks and to provide a system for producing sausage-shaped products which is of a simple design and which is operable with a reduced control amount.

SUMMARY

According to the present invention, there is provided a system for producing sausage-shaped products, like sausages, containing a flowable filling material in a tubular or bag-shaped packaging casing and a suspension element, like a suspension loop. The system includes a clipping machine for producing the sausage-shaped products, a discharge device for discharging the sausage-shaped products out of the clipping machine and a feeding device for feeding a rod-like element into a loading position. In the inventive system, the suspension loops of the sausage-shaped products are stored on the rod-like element by the discharge device. In particular, the sausage-shaped products are hung up with their suspension loops on a rod-like element.

This design enables to transfer the sausage-shaped products directly from the discharge device onto the rod-like element, like a smoking bar or the like. Accordingly, no additional transfer device has to be positioned between the discharge device and the feeding device of the rod-like element in the loading position, respectively. The construction of the system is simplified and the control amount is reduced. Moreover, the transport distance is reduced so that the overall area being necessary for installing the system is remarkably reduced.

In the inventive system, the clipping machine comprises a filling tube on which the tubular or bag-shaped packaging casing is stored and through which filling material, like sausage meat, adhesive, sealing material etc. is fed in a feeding direction into the tubular or bag-shaped packaging casing, gathering means for gathering the filled tubular or bag-shaped packaging casing and for forming a plait-like portion thereto and a clipping device for applying at least one closure means, like a closure clip, to the plait-like portion for closing the just filled portion of the tubular or bag-shaped packaging casing and for applying a suspension element, like a suspension loop, thereto.

The clipping machine enables the production of sausage-shaped products which may be transferred to and stored on the rod-like element provided by the feeding device in the loading position.

It has to be understood that the clipping machine is adapted to place a single closure clip on the plait-like portion for closing the just filled portion of the tubular or bag-shaped packaging casing, or to apply two closure clips thereto, a first closure clip for closing the rear end of the just filled portion of the tubular or bag-shaped packaging casing, and a second closure clip for closing the front end of the portion of the tubular or bag-shaped packaging casing subsequently to be filled.

Furthermore, the clipping machine may produce single sausage-shaped products with one suspension loop at one of their ends, chains of sausage-shaped products with one suspension loop at one end of each chain of products or sausage rings also provided with a suspension loop at one end of the ring.

In a preferred embodiment of the inventive system, the discharge device comprises a conveyor means having a first and a second end with the first end directed to the clipping machine and the second end directed in feeding direction, a catching device for catching the suspension element of the sausage-shaped product and for guiding the suspension element in feeding direction, and a telescopic device for reversibly moving the second end of the conveyor means in the feeding direction.

The discharge device thereby enables to vary the length of the conveyor means, whereby the sausage-shaped products fed onto the rod-like element by the discharge device may be placed consecutively on selected positions on the rod-like element. Thus, the sausage-shaped products may be arranged very flexible on the rod-like element, e.g. in regular or non-regular intervals or in a combination thereof which may be selected with regard to one ore more features of the sausage-shaped products, like their size or kind.

It has to be understood that the conveyor means include at least one conveyor element for conveying the sausage-shaped product out of the clipping machine. The conveyor element may be realized by at least one conveyor belt, at least one conveyor chain or any other suitable element which enables the transfer of a sausage-shaped product. Naturally, more than one conveyor element may be provided, like two conveyor belts or chains which are arranged side by side.

In a further preferred embodiment of the inventive system, the feeding device comprises a feeding mechanism for feeding a single rod-like element into a loading position in which the sausage-shaped products are hung up by their suspension elements onto said rod-like element.

The feeding mechanism of the feeding device includes at least one support mechanism for supporting the rod-like element when positioned in the loading position. The rod-like element when positioned in the loading position, is placed inside or at least very close to the feeding device, whereby a compact design of the system is enabled with a reduced size ratio.

It is of advantage that the discharge device further comprises at least one drive means for driving the conveyor means and the telescopic device. Such drive means enable a coordinated movement of the conveyor means and the telescopic device, e.g. in adaption to the sausage-shaped products to be stored on the rod-like element.

Said at least one drive means may be used to commonly drive the conveyor means and the telescopic device. This can be realized in various ways, for example by including a single drive element, like a single drive motor for commonly driving the conveyor means and the telescopic device.

Alternatively, the drive means include a first drive device for driving the conveyor means and a second drive device for driving the telescopic device. In this arrangement, the conveyor means and the telescopic device may be controlled independently from each other or in varying relation, whereby the flexibility of the discharge device with regard to the variety of products is increased.

The telescopic device for reversibly moving the second end of the conveyor means in the feeding direction may be realized in various ways. In one exemplary embodiment, one or more conveyor elements, like conveyor belts, may be provided wound about one ore more roller assemblies, which are arranged such that a common conveyor means may be established with a varying length.

In a preferred embodiment, the telescopic device includes a base assembly, a first slide assembly reversibly movable relative to the base assembly in the feeding direction and a second slide assembly reversibly movable relative to the first slide assembly in the feeding direction.

In a further preferred embodiment, the discharge device can include a release mechanism for releasing the conveyor element from the conveyor device. The release mechanism allows the quick and easy removal of the conveyor element from the discharge device, e.g. for maintenance or cleaning of the discharge device or the whole system.

In one embodiment, the release mechanism may include at least one clamping and releasing assembly for reversibly clamping or fixing carrier elements which carry the conveyor element during operation, like pulleys, about which a conveyor belt is wound, or sprocket wheels of a chain conveyor, and for releasing said carrier elements to relieve the conveyor element.

The catching device for catching and guiding the suspension element attached to the sausage-shaped product is mounted to the conveyor means in a fixed orientation in order to enable a defined guidance of the suspension element along the conveyor means. Thus, the catching device may be fixedly mounted to the conveyor means. However, in a further embodiment, the catching device may removably be attached to the conveyor means. In this embodiment, the discharge device may discharge sausage-shaped products which are not intended to be hung up on a rod-like element, e.g. when separately and/or manually be treated.

In order to arrange the discharge device in a defined position relative to the machine for producing sausage-shaped products, like a clipping machine, it is of advantage that the clipping machine includes coupling means for coupling the discharge device to the clipping machine.

It has to be understood that the coupling means of the clipping machine cooperate with respective counter-coupling means provided at the discharge device.

The coupling means of the clipping machine and the counter-coupling means of the discharge device, in the following commonly recited as coupling means, may be of any suitable design, like grooves which receive corresponding tongues, or one ore more holes accommodating respective bolts.

Providing coupling means on the clipping machine and on the discharge device enables a modular design of the production system such that a clipping machine may be coupled with different discharge devices, e.g. having different length or width, and being provided with identical coupling means.

It is also possible that the coupling means provide a hinge connection between the clipping machine and the discharge device for pivoting the discharge device relative to the clipping machine, e.g. between a working position and a maintenance or cleaning position. This pivoting movement can be carried out in an at least substantially horizontal plane.

It is further of advantage that the discharge device is provided with a catching device for catching the suspension element, like a suspension loop, attached to the sausage-shaped body of the sausage-shaped product.

The catching device may be realized in various ways. In one embodiment, the catching device may include at least one guide element, like a guide bar, which comprises a catching pin at its end facing to the clipping machine and connecting means at its other end facing to the feeding device for connecting the guide element with the rod-like element to which the suspension element has to be transferred.

The guide element is supported by support elements which enable a suspension element to be guided along the guide element without being disturbed by the support elements. The support elements for the guide element may be realized by support pins which reversibly engage the guide element, or rollers which engage the guide element without impeding, e.g. by overrunning, a suspension element guided along the guide element.

The catching device may include a drive for driving the support elements supporting the guide element. On the other hand, the support elements may be driven by an external drive, like the drive for driving the conveyor element.

In a preferred embodiment, the feeding device for feeding a rod-like element into a loading position includes a storage for accommodating a supply of rod-like elements. The feeding device may thereby continuously feed rod-like elements into the loading position to enable a continuous production process.

In a further preferred embodiment, the feeding device includes separation and delivering means for separating a single rod-like element out of a plurality of rod-like elements stored in the storage of rod-like elements and delivering said single rod-like element towards the loading position. Thereby, it is ensured that just one single rod-like element is fed into the loading position.

Additionally, the feeding device and/or the separation and delivering means may be equipped with sensor devices for sensing the presence or absence and/or the accurate position of rod-like elements in the storage and/or the loading position.

Further additionally, the feeding device may comprise coupling means for coupling the feeding device to the clipping machine in order to ensure an accurate positioning of the feeding device relative to the clipping machine, and/or to the discharge device. Moreover, said coupling means may also enable a pivot movement of the feeding device relative to the clipping machine, e.g. between a working position and a maintenance or cleaning position. This pivoting movement can be carried out in an at least substantially horizontal plane.

The coupling means for coupling the feeding device to the clipping machine further enable a modular design of the production system such that a clipping machine may be coupled with different feeding devices, e.g. for feeding rod-like element of different length or cross sectional profile.

The feeding device may include a storage into which an operator may fill a number of rod-like elements, and from which said rod-like elements are separated and delivered by separation and delivering means into the loading position. The separation and delivering means may of any suitable design, e.g. they may include separating assemblies, like gripping assemblies for gripping a single rod-like. In an alternative design, one or more slots may be provided the width of which corresponds to the cross-sectional profile of the rod-like elements, and which may accommodate one ore more single rod-like elements for guiding said single rod-like elements successively to the loading position.

The feeding device may also be provided with a transportation assembly for transporting a rod-like element with the sausage-shaped products stored thereon out of the loading position to a removal position. The transportation assembly may include conveyor means for conveying the filled rod-like elements, i.e. the rod-like elements with the sausage-shaped products hung up thereon, away from the loading position towards the removal position in which the rod-like elements with the sausage-shaped products stored thereon may be removed from the feeding device, e.g. by manually an operator or automatically by a robotic device.

The transportation assembly may further include a transfer mechanism for transferring the filled rod-like elements from the loading position onto the conveyor means. Additionally, sensor devices may be provided for detecting the filled rod-like element being removed from the loading position for enabling the next rod-like element to be released into the loading position.

The conveyor means may be realized by a single conveyor which includes a clamping device for clamping one end of the rod-like element to be moved towards the removal position. The conveyor means may also include two conveyors each supporting one end of the filled rod-like element while being moved towards the removal position. The conveyor means may include any suitable conveyor element. However, it is preferred that the conveyor elements are conveyor belts or conveyor chains.

The conveyor means and the transfer mechanism of the transportation assembly may be provided with separate drives for driving the conveyor means and the transfer mechanism. In this case, a control unit controls the movement of the conveyor means and the transfer mechanism such that they are synchronously driven. In other words, after the transfer mechanism has transferred a filled rod-like element onto the conveyor means, the conveyor means is moved in transportation direction about a distance corresponding to the distance between two subsequently arranged filled rod-like elements. In case that the conveyor elements have support elements for accommodating and supporting a rod-like element, like recesses, the conveyor means are moved about a distance corresponding to the distance between two successive support elements or multiple thereof.

Naturally, the conveyor means and the transfer mechanism may be driven by a common drive. In this case, coupling means, like a gear, coupling the conveyor means and the transfer mechanism to each other such that they are driven in defined relation. Such a gear may include a chain drive having sprocket wheels of defined size for enabling a predefined transmission ratio.

Furthermore, the feeding device may include a standby position in which an empty rod-like element is kept ready for being moved into the loading position immediately after a filled rod-like element has been moved out of the loading position.

The rod-like element provided in the loading position may be supported by the feeding device, e.g. by support elements supporting both ends of the rod-like element. Naturally, the rod-like element may also be supported at one end only, e.g. by a respective clamping device. In this case, the free or unsupported end of the rod-like element is directed towards the discharge device for receiving the suspension elements of the sausage-shaped products delivered by the discharge device.

In an alternative embodiment, the discharge device includes a first support element for supporting one end of the rod-like element provided in the loading position, and the feeding device includes a second support element for supporting the second end of the rod-like element provided in the loading position. The suspension element, and thus, the sausage-shaped product may be transferred from the discharge device for example from the catching device directly onto the rod-like element in the loading position without any intermediate guide or transportation devices. This construction reduces the number of system components and the control effort.

In the case that the first support element for supporting the rod-like element in the loading position is provided at the discharge device, it is of advantage that the first support element forms the end of the guide element of the catching device facing in discharge direction. Thereby, the suspension element caught by the catching device may directly be moved onto the rod-like element.

The first support element may be formed in any suitable manner, like a pin, which engages a hole in the end of the rod-like element or a sleeve into which the end of the rod-like element is inserted. Advantageously, the first support element has the form of a semicircular shell on which the end of the rod-like element rests. This design enables an easy positioning of the rod-like element on the first support element and also an easy removal there from, particularly without the need of shifting the rod-like element in its longitudinal direction.

In a preferred embodiment of the inventive system, the feeding device is positioned such that the second end of the conveyor means of the discharge device may reversibly be moved along the rod-like element provided by the feeding device in the loading position. This allows the positioning of the sausage-shaped products one after the other on the rod-like element and directly by the discharge device.

The discharge device for reversibly moving the second end of the conveyor means includes a telescopic device. This telescopic device may be controlled such that the second end of the conveyor means may be positioned in any desired position along the rod-like element. Thereby, the position and the distance between the sausage-shaped products suspended on the rod-like element by the discharge device, may individually be selected for each single sausage-shaped product, or in accordance with the kind and/or size of the sausage-shaped products just produced. Thus, it is possible to suspend different kinds of sausage-shaped products which may also have different size, at the same rod-like element, or to position identical sausage-shaped products in regular intervals on the rod-like element.

According to the present invention, there is also provided a method for controlling a system for producing sausage-shaped products, like sausages, containing a flowable filling material in a tubular or bag-shaped packaging casing and a suspension element, like a suspension loop, wherein the system includes a clipping machine for producing the sausage-shaped products, a discharge device for discharging the sausage-shaped products out of the clipping machine and a feeding device for feeding a rod-like element into a loading position. The method comprises the steps of providing a tubular or bag-shaped packaging casing on a filling tube of the clipping machine, feeding filling material into the tubular or bag-shaped packaging casing closed at its front end, gathering the filled tubular or bag-shaped packaging casing, applying at least one closure clip to the gathered portion of the filled tubular or bag-shaped packaging casing and attaching a suspension element, like a suspension loop, thereto. The method further comprises the step of discharging the sausage-shaped product form the clipping machine and suspending the sausage-shaped product on a rod-like element provided in a loading position by the discharge device.

In an embodiment, in which the discharge device comprises a conveyor means having a first and a second end with the first end directed to the clipping machine and the second end directed in feeding direction, a catching device for catching the suspension element of the sausage-shaped product and for guiding the suspension element in feeding direction, and a telescopic device, the method according to the present invention further comprises the step of reversibly moving the second end of the conveyor means in the feeding direction. Thereby, the sausage-shaped product discharged from the clipping machine may be suspended at a predefined position on the rod-like element by the discharge device.

The inventive method thereby provides all advantages explained in conjunction with the inventive system for producing sausage-shaped products.

Further advantages and preferred embodiments of the present invention will be described in the following together with the drawings listed below. The expressions "left", "right", "below" and "above" used in the following description, are referred to the drawings in an alignment such that the reference numbers and the notation of the figures used can be read in normal orientation.

DETAILED DESCRIPTION

Figure 2:
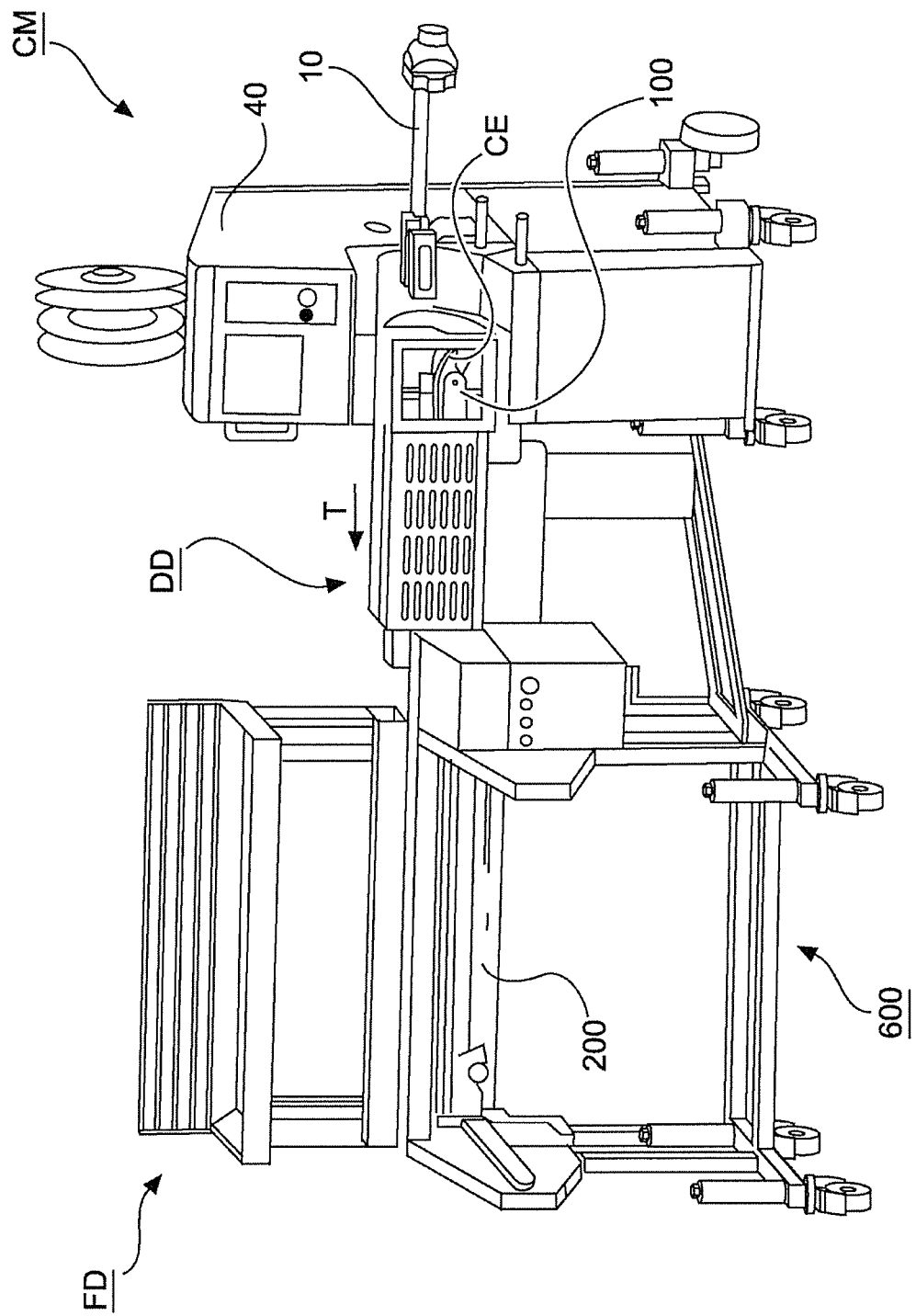
FIG. 2: is a schematic and perspective view to the front side of a system for producing sausage-shaped products according to the present invention.
Figure 3:
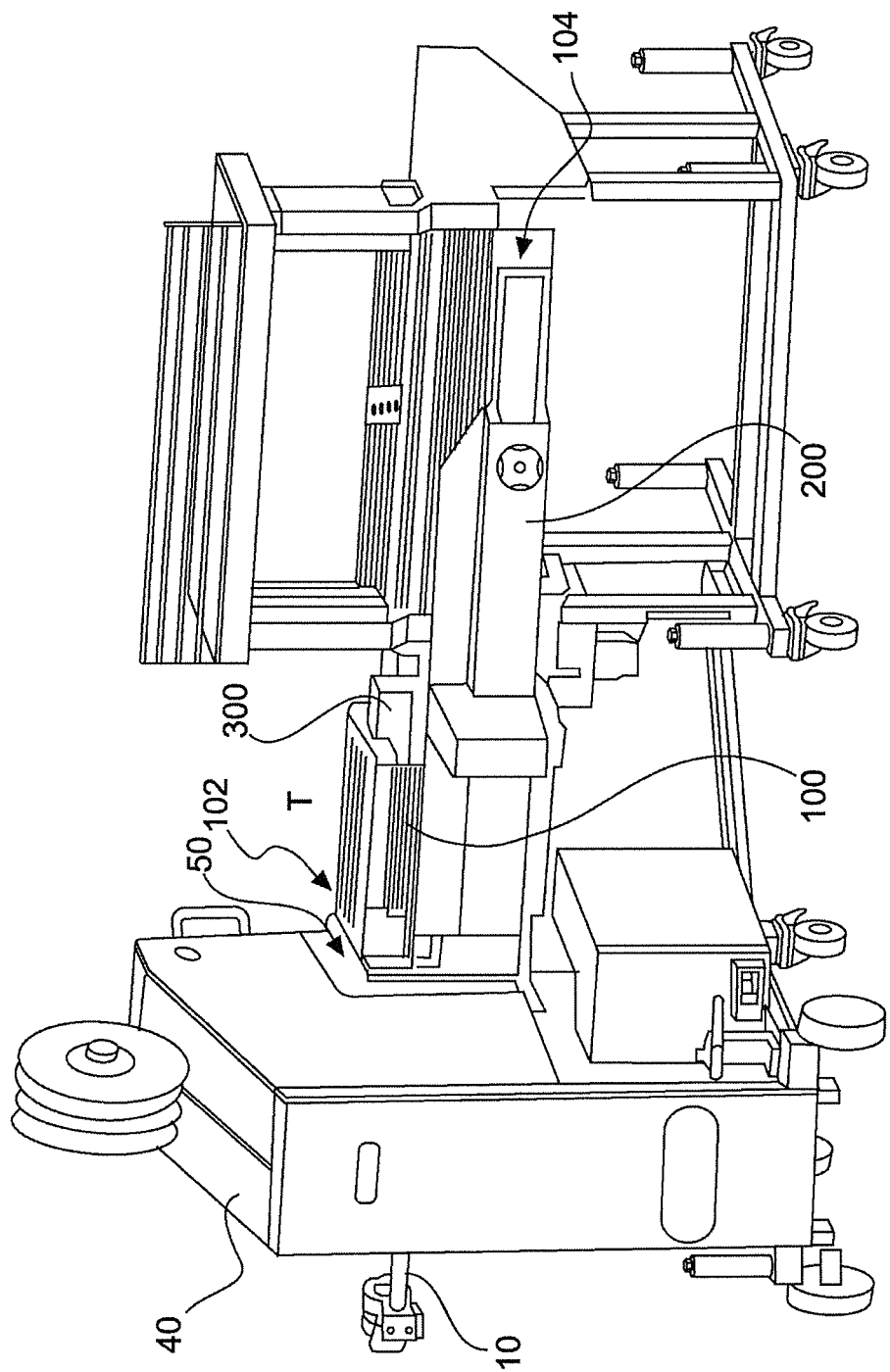
FIG. 3: is a schematic and perspective view to the rear side of a system for producing sausage-shaped products as shown in FIG. 2.
Figure 4:
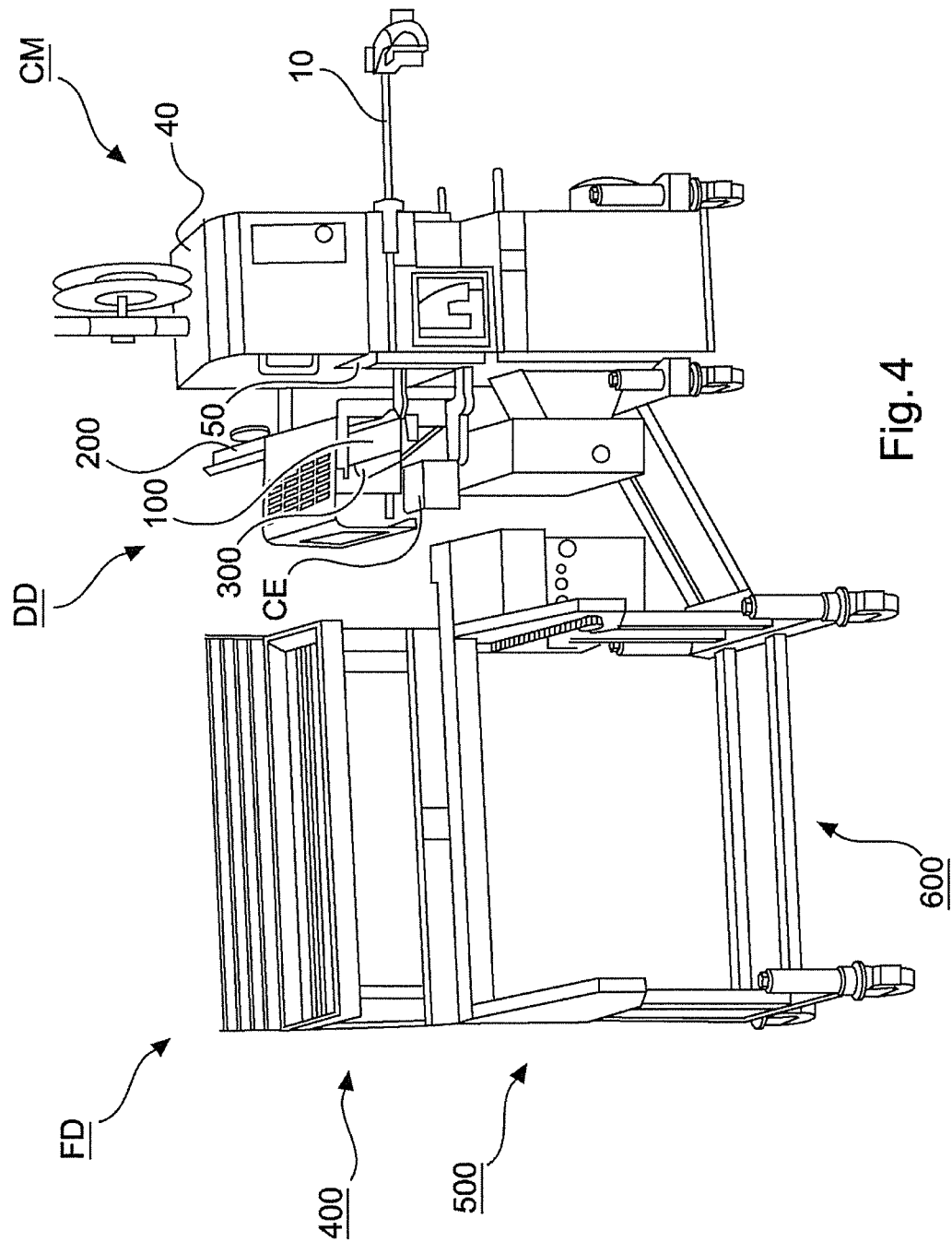
FIG. 4: is a schematic and perspective view to the front side of a system for producing sausage-shaped products as shown in FIG. 2, with a discharge device in an inoperative position.

A system for producing sausage-shaped products according to the present invention as completely shown in FIGS. 2 to 4 includes as its main components a clipping machine CM for producing sausage-shaped products S, a discharge device DD for discharging the sausage-shaped products S from clipping machine CM and a feeding device FD for feeding rod-like elements R into a loading position in which sausage-shaped products are suspended on said rod-like element R.

Figure 1:
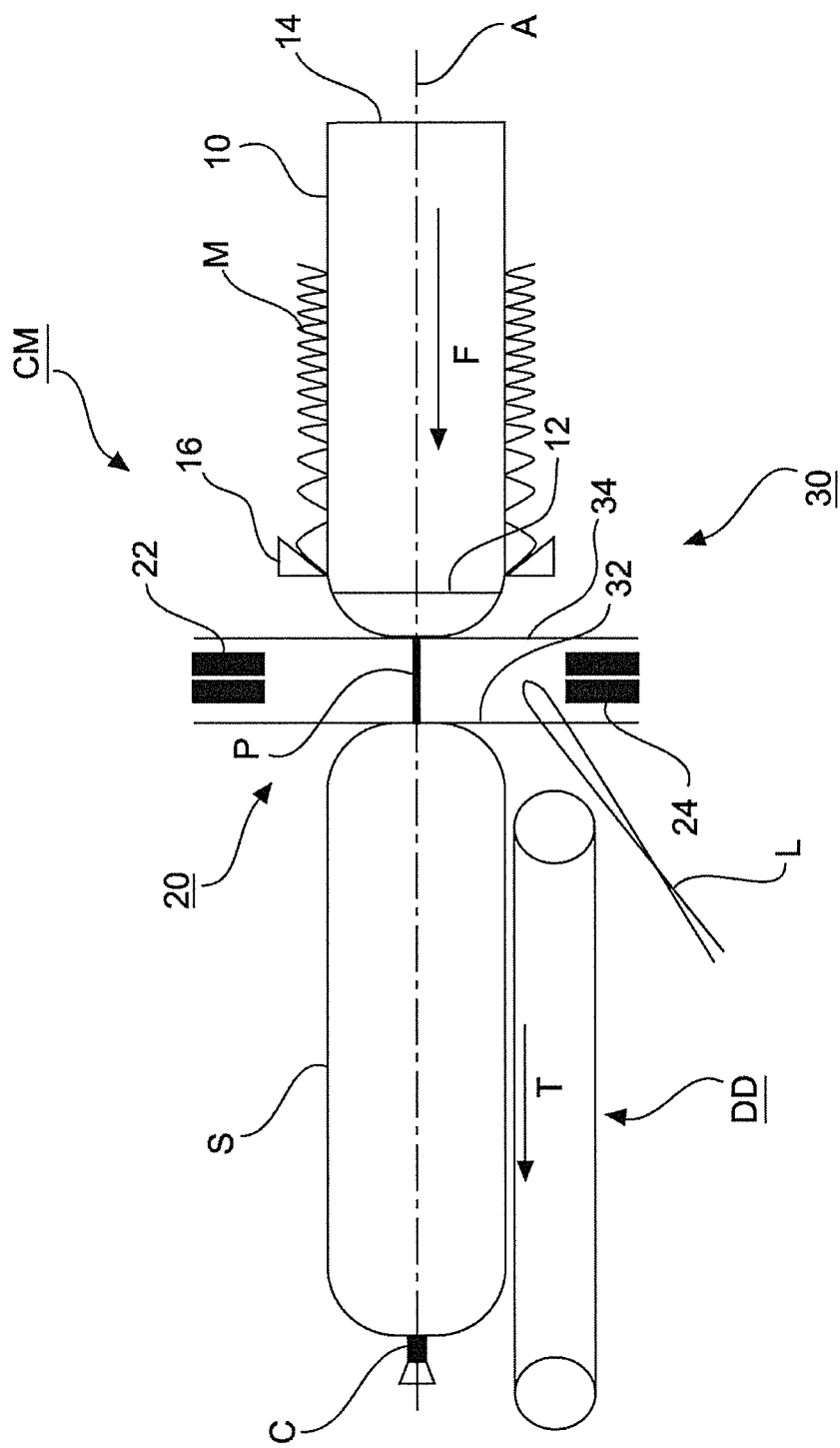
FIG. 1: is a schematic view showing the principal design of a clipping machine.

A clipping machine CM for producing sausage-shaped products S shown in FIG. 1, comprises as main components a filling tube 10 having a longitudinally extending center axis A and with a discharge opening for a filling material at its left end 12 and a feeding opening for the filling material fed to the filling tube 10, for example a feeding pump, at its right end 14, a casing brake assembly 16 arranged coaxially with filling tube 10 in the region of the left end 12 of filling tube 10. Filling tube 10 is made of a suitable material, like stainless steel. A supply of tubular packaging casing material M made of a thin sheet material is stored on the filling tube 10. From the supply of tubular packaging casing material M, a single packaging casing is pulled-off during the process of manufacturing the sausage-shaped products S. Clipping machine 1 further comprises a clipping device 20 for closing a filled tubular packaging casing M by applying closure means, like closure clips C, to a plait-like portion P, and gathering means 30 for gathering the filled tubular packaging casing M and for forming said plait-like portion P thereto, and which are all arranged downstream filling tube 10.

Right end 14 of horizontally arranged filling tube 10 is coupled to a filler arrangement (not shown) including a pump for feeding filling material through filling tube 10 in a feeding direction F into tabular packaging casing M closed on its front end facing in the feeding direction F, by a closure clip C.

As it can be inferred from FIG. 1, positioned immediately downstream left end 12 of filling tube 10, clipping device 20 is arranged and coaxially aligned to filling tube 10. Clipping device 20 comprises a first and a second clipping tool 22, 24 formed by a punch 22 and a die 24. It has to be noted that punch 22 and die 24 may apply and close a single closure clip C for closing the just filled tubular packaging casing M, or may apply and close two closure clips C at the same time, a first closure clip C for closing the just filled tubular packaging casing M for forming a sausage-shaped product S, and a second closure clip C for closing the front end of the tubular packaging casing M subsequently to be filled. Gathering means 30 includes a first displacer unit 32 and a second displacer unit 34, wherein first displacer unit 32 is positioned downstream second displacer unit 34. First and second clipping tools 22, 24 of clipping device 20 may be positioned between first and second displacer units 32, 34, at least for applying and closing one or two closure clips C to plait-like portion P.

If it is desired to suspend sausage-shaped product on a rod-like element, like a smoking rod, e.g. for further treatment, a suspension element, like a suspension loop L, may be provided such that suspension loop L is attached to sausage-shaped product S by means of one of closure clips C. According to FIG. 1, suspension loop L is provided in the movement path of die 24 such that suspension loop L is engaged by a closure clip C halt in die 24 to be applied to plait-like portion P and attached thereto together with closure clip C.

Furthermore, for discharging a sausage-shaped product S just produced from clipping machine CM, downstream clipping device 20, a discharge device DD, like a belt conveyor may be arranged, which may comprise a conveyor belt and guide rollers. Transportation direction T of discharge device DD usually coincides with feeding direction F.

Clipping device 20 and gathering means 30 are accommodated in a housing 40 of clipping machine CM. Filling tube 10 extends approximately horizontally and with its left end 12 towards the right side of housing 40 of clipping machine M. On the left side of housing 40 of clipping machine CM and aligned with longitudinal axis L of filling tube 10, a discharge opening 50 is arranged (cf. FIGS. 3, 4).

Figure 12:
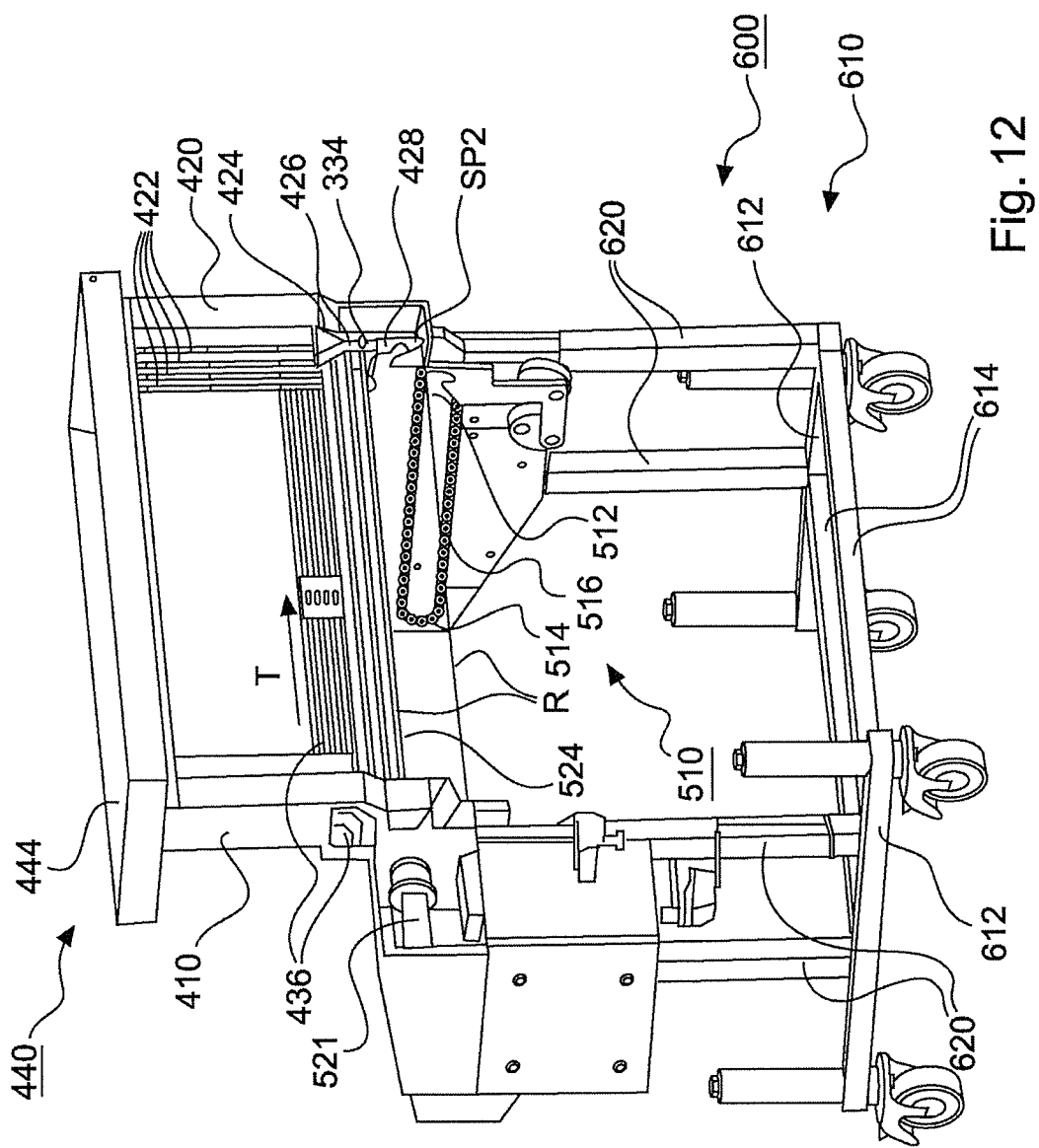
FIG. 12: is a schematic and perspective view to the rear side of a feeding device of the system according to the present invention.

As can be seen from FIGS. 2 and 3, discharge device DD includes conveyor means 100 for conveying the sausage-shaped product from the clipping machine CM towards the rod-like element R provided in the loading position, a telescopic device 200 for releasing the sausage-shaped product S at a predefined position relative to rod-like element R, and a catching device 300 for catching the suspension element or loop L of sausage-shaped product S and guiding said loop L onto rod-like element R in the loading position. In FIG. 12, two rod-like element R are schematically shown, lower rod-like element R in the loading position with is downstream end supported by a second support portion SP2, and the upper rod-like element R in a standby position, as it will be explained in detail below.

Figure 5:
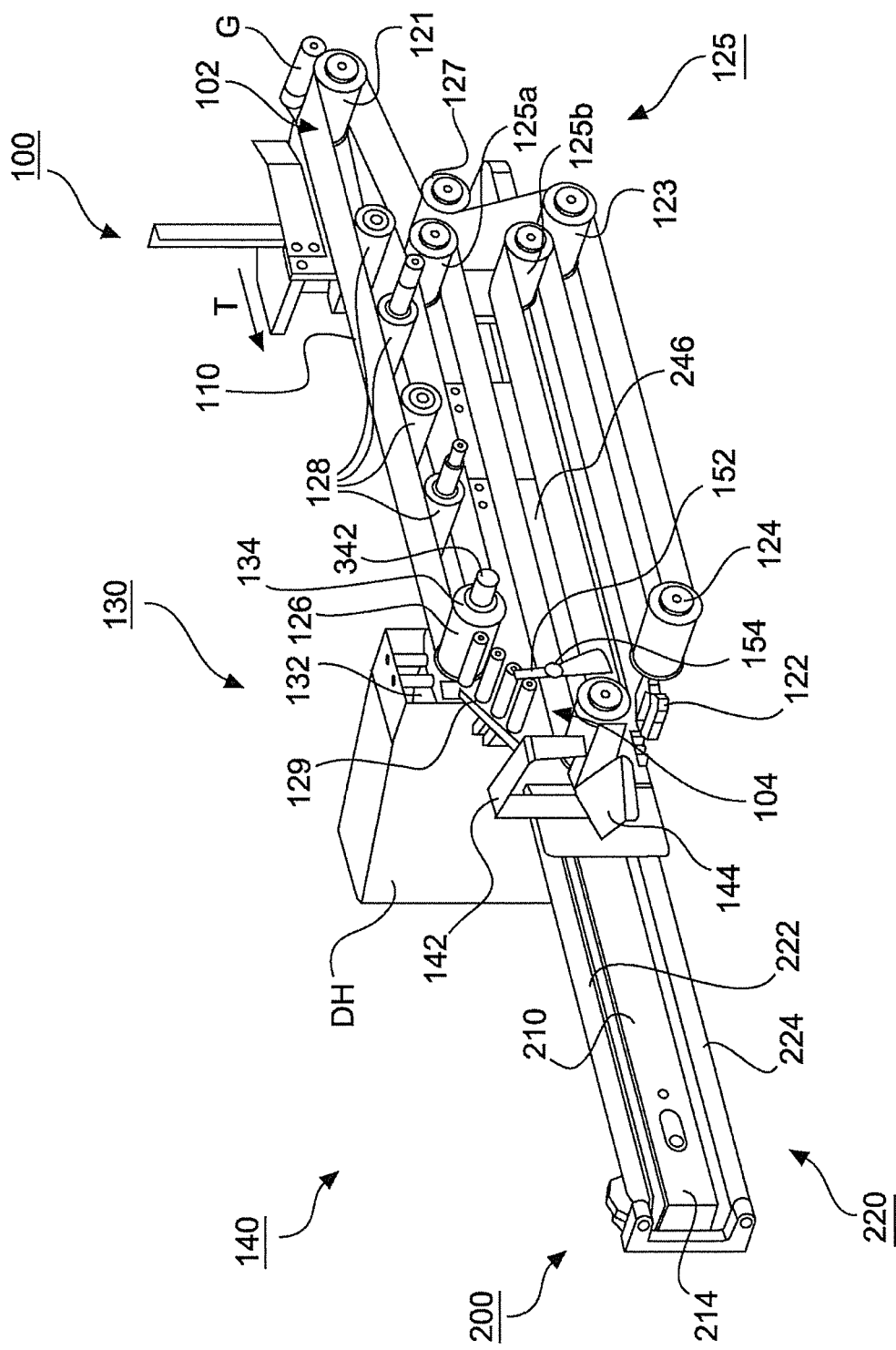
FIG. 5: is a schematic and perspective view to the front side of a discharge device of the system according to the present invention, with a telescopic device in the retracted position.

Conveyor means 100 has a first end 102 and a second end 104 (cf. FIG. 5). Conveyor means 100 is aligned to a discharge opening 50 of clipping machine CM with first end 102 facing towards clipping machine CM and second end 104 facing in feeding direction F.

Conveyor means 100 includes a conveyor belt 110 as the conveyor element, and a roller arrangement 120 about which conveyor belt 110 is wound. As can be seen in FIG. 5, roller arrangement 120 includes a first roller 121 which forms first end 102 of conveyor means 100, a second roller 122 which forms the second end 104 of conveyor means 100, two lower deflection rollers 123, 124, a pair of interconnected rollers 125 with an upper roller 125a and a lower roller 125b arranged vertically below and in a fixed distance to upper roller 125a, a third deflection roller 126, a tensioning roller 127, support rollers 128 and a guide roller arrangement 129.

The axles of all rollers 121, 122, 123, 124, 125, 126, 127, 128, 129 are arranged approximately parallel to each other. First roller 121, support rollers 128 and third roller 126 are arranged successively in transportation direction and form a first transportation plane in which a sausage-shaped product S is discharged out of clipping machine CM in transportation direction T. Lower deflection rollers 123, 124 are arranged in a common plane forming the lower end of conveyor means 100. All remaining rollers are arranged between the planes formed by first and third rollers 121, 126 and lower deflection rollers 123, 124. Second roller 122 at second end 102 of conveyor means 100 is arranged approximately centrally between the first transportation plane formed by first and third rollers 121, 126 and the lower most plane formed by lower deflection rollers 123, 124. Interconnected rollers 125 are arranged vertically above each other with upper roller 125a in a horizontal position between first and second rollers 121, 122, and with lower roller 125b in a horizontal position between second roller 122 and lower deflection rollers 123, 124. Tensioning roller 127 is positioned upstream rollers 125.

Figure 6:
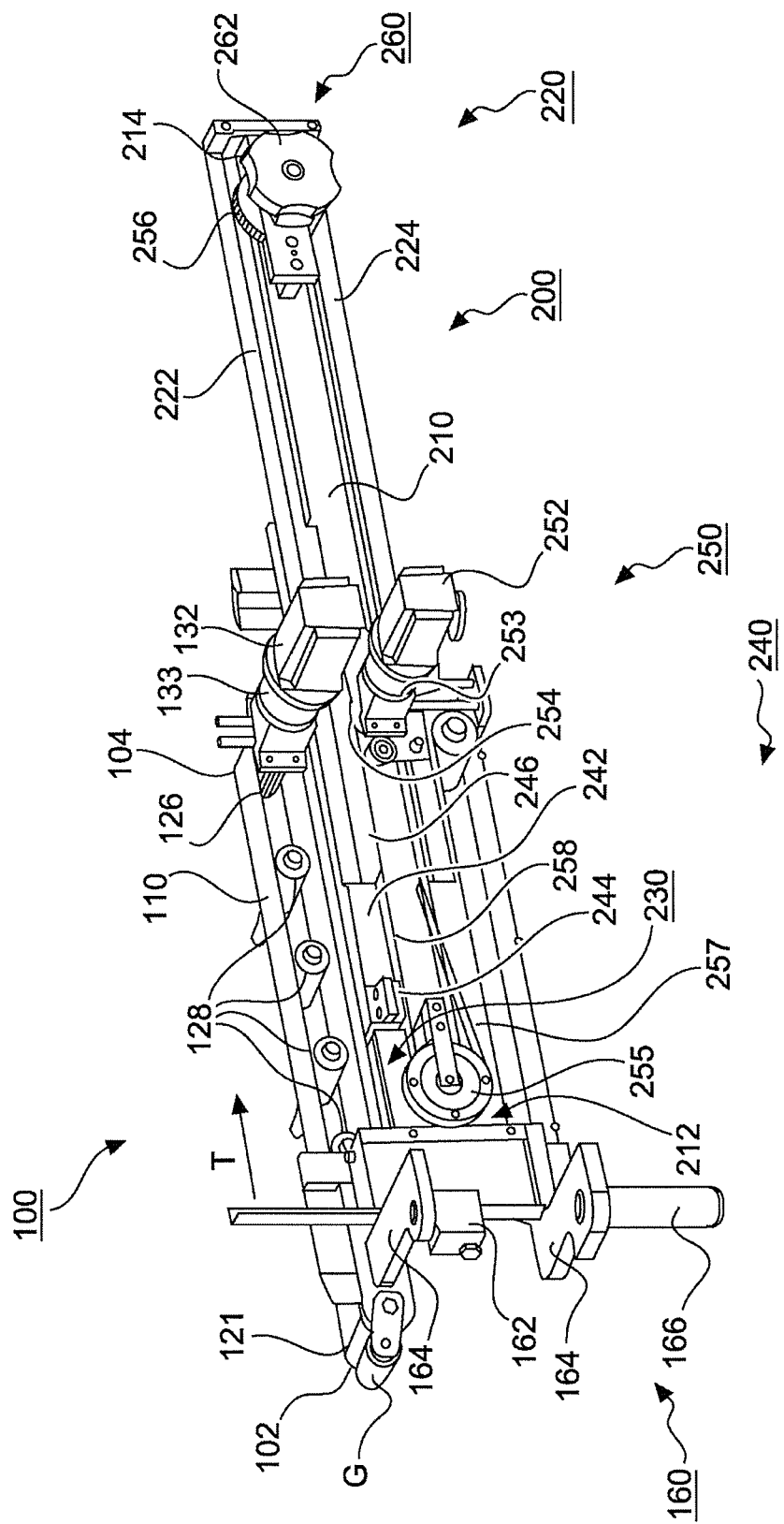
FIG. 6: is a schematic and perspective view to the rear side of the discharge device as shown in FIG. 5.

As can be seen in FIGS. 5 and 6 which show telescopic device 200 in its retracted position, conveyor belt 110, seen in transportation direction T, is guided around first roller 121 at first end 102 of conveyor means 100 and extends towards third roller 126. Between first and third rollers 121, 126, support rollers 128 are arranged for supporting the section of conveyor belt 110 extending between first and third rollers 121, 126.

Conveyor belt 110 is further approximately horizontally routed from the lower side of third roller 126 towards clipping machine CM, wound about upper roller 125a of interconnected rollers 125 and guided in transportation direction T to the upper side second roller 122. From the lower side of second roller 122, conveyor belt 110 is directed to the upper side of lower roller 125b of interconnected rollers 125. From lower roller 125b, conveyor belt 110 is approximately horizontally guided to the upper side of roller 124, wound about roller 124 and further guided to roller 123. From roller 123, conveyor belt 110 extends along tensioning roller 127 and back to first roller 121, whereby the loop formed by conveyor belt 110 is closed.

As particularly shown in FIG. 5, guide roller arrangement 129 comprises a number of small rollers arranged parallel to each other and in a common plan, and extending in transportation direction T from third roller 126. The plane formed by guide roller arrangement 129 inclines from third roller 126 towards second roller 122, and bridges the horizontal gap between the horizontally extending portion of conveyor belt 110 between first and third roller 121, 126 and the horizontally extending portion of conveyor belt 110 between third roller 126 and upper roller 125a of interconnected rollers 125.

Conveyor belt 110 of conveyor means 100 is driven by a conveyor drive 130 which includes a drive element or motor 132 and a drive axle 134 on which third roller 126 of roller arrangement 120 is mounted (cf. FIGS. 5 to 8).

Telescopic device 200 includes a base frame 210 with a first end 212 and a second end 214, a guide assembly 220 including horizontally extending guide rods 222, 224, a first slider assembly 230 and a second slider assembly 240 which are slideable arranged at guide rods 222, 224 of guide assembly 220. Approximately bar-shaped base frame 210 extends between horizontally arranged guide rods 222, 224 of guide assembly 220 and parallel thereto. Guide rods 222, 224 are coupled to first and second ends 212, 214 of base frame 210.

Telescopic device 200 further comprises a telescope drive 250 arranged on the rear side of base frame 210, which includes a drive element or motor 252 and a drive wheel 254 arranged at the drive axle of motor 252. Telescopic drive 200 further comprises a first pulley 255 rotatable attached to first end 212 of base frame 210, a second pulley (not visible) which is arranged between first pulley 255 and first end 212 of base frame 210 and a third pulley 256 attached to second end 214 of base frame 210 as well as a first drive element 257 and a second drive element 258.

In the shown embodiment, drive elements 257, 258 are toothed belts and drive wheel 254 as well as first, second and third pulleys 255, 256 comprise a corresponding toothed surface. First drive element or toothed belt 257 is wound about first pulley 255 and drive wheel 254 of motor 252. Second drive element or toothed belt 258 is wound about second pulley, drive wheel 254 of motor 252 and third pulley 256 at second end of base frame 210. Accordingly, toothed belts 257, 258 are commonly driven by motor 252 of telescopic drive 250. Furthermore, second pulley is arranged behind first pulley 255, i.e. between first pulley 255 and first end 212 of base frame 210, and of a smaller outer diameter than first pulley 255, thus, it is not visible in the Figs.

Motor 132 of conveyor drive 130 and motor 242 of telescopic drive 250 are mounted to the rear side of base frame 210 and commonly covered by a drive housing DH (cf. FIG. 5). Furthermore, conveyor drive 130 and telescopic drive 250 further include gear mechanisms 133, 253 which are attached to motors 132, 252 of conveyor drive 130 and telescopic drive 250, respectively (cf. FIGS. 6 to 8).

It has to be noted that telescopic device 200 and conveyor means 100 may be driven by a single drive means, like an electric motor, which commonly drives telescopic device 200 and conveyor means 100.

First slider assembly 230 includes a body portion 232 which is slidably fixed on guide rods 222, 224 of guide assembly 220. First slider assembly 230 further includes a mounting arrangement 234 by means of which first slider assembly is fixedly coupled to toothed belt 257. Accordingly, when driving toothed belt 257, first slider assembly 230 may reversibly moved along guide rods 222, 224 of guide assembly 220 between motor 252 and first pulley 255 of telescopic drive 250.

Furthermore, first slider assembly 230 carries interconnected rollers 125 which are reversibly movable in transportation direction T together with first slider assembly 230.

Second slider assembly 240 includes a body portion 242 which is slidable fixed on guide rods 222, 224 of guide assembly 220, and downstream first slider assembly 230. Second slider assembly 240 further includes a mounting arrangement 244 by means of which second slider assembly 240 is fixedly coupled to toothed belt 258. Accordingly, when driving toothed belt 258, second slider assembly 240 may reversibly moved along guide rods 222, 224 of guide assembly 220 between first pulley 255 and third pulley 256 of telescopic drive 250. Second slider assembly 240 additionally comprises an approximately rectangular carrier plate 246. Carrier plate 246 is vertically arranged and extends in transportation direction T. With its upstream end 246a, carrier plate is mounted to body portion 242 of slider assembly 240, and its second end 246b extends downstream, i.e. in transportation direction T.

At second end 246b of carrier plate 246, second roller 122 is mounted. Second roller 122 is reversibly movable in transportation direction T together with second slider assembly 240.

In the retracted position shown in FIGS. 5 and 6, first slider assembly 230 is positioned at first end 212 of base frame 210 and second slider assembly 240 is positioned downstream first slider assembly 230 and closed thereto.

The size of first pulley 255, second pulley and drive wheel 254, i.e. their diameter, is selected such that second slider assembly 240 is moved along guide rods 222, 224 of guide assembly 220 with the double speed than first slider assembly 230. Accordingly, also second slider assembly 240, and particularly by second roller 122, travels the double distance as first slider assembly 230 with interconnected rollers 125 mounted thereto.

As a consequence, conveyor means 100 may be extended approximately up to an overall length of three times of its initial length. The specific ratio of the movement speed of first and second slider assemblies 230, 240 ensures that conveyor belt 110 has a constant tension in each intermediate position between the retracted position and the fully extended position.

It has to be understood that motor 132 of conveyor drive 130 and motor 242 of telescopic drive 250 are coupled to a respective control unit for controlling the production process. Accordingly, telescopic drive 250 may be controlled such that second end 104 of conveyor means 100 may reversibly be moved to each position between the retracted position and the fully extended position.

Additionally, discharge device DD includes a release mechanism 260 for releasing the coupling between third pulley 256 and base frame 210. Release mechanism 260 comprises a handle 262 and a release assembly (not shown). When releasing the connection between third pulley 256 and base frame 210, conveyor belt 110 may be slacked and removed from conveyor means 100. Alternatively, a release mechanism may also be provided at any other suitable position of conveyor device 100, e.g. for releasing other rollers, like first roller 121 or interconnected rollers 125, in order to enable a mounting or demounting of conveyor belt 110 to or from conveyor means 100.

As can be seen in FIGS. 5 and 6, a single guide roller G is provided immediately upstream first roller 121 of roller arrangement 120. Guide roller G is arranged horizontally and parallel to first roller 121. Guide roller G may bridge a gap between first end 102 of conveyor device 100 and discharge opening 50 of clipping machine CM.

Discharge device DD further comprises a catching device 300 for catching suspension element or loop L of sausage-shaped product S and for guiding loop L to rod-like element R.

Figure 9:
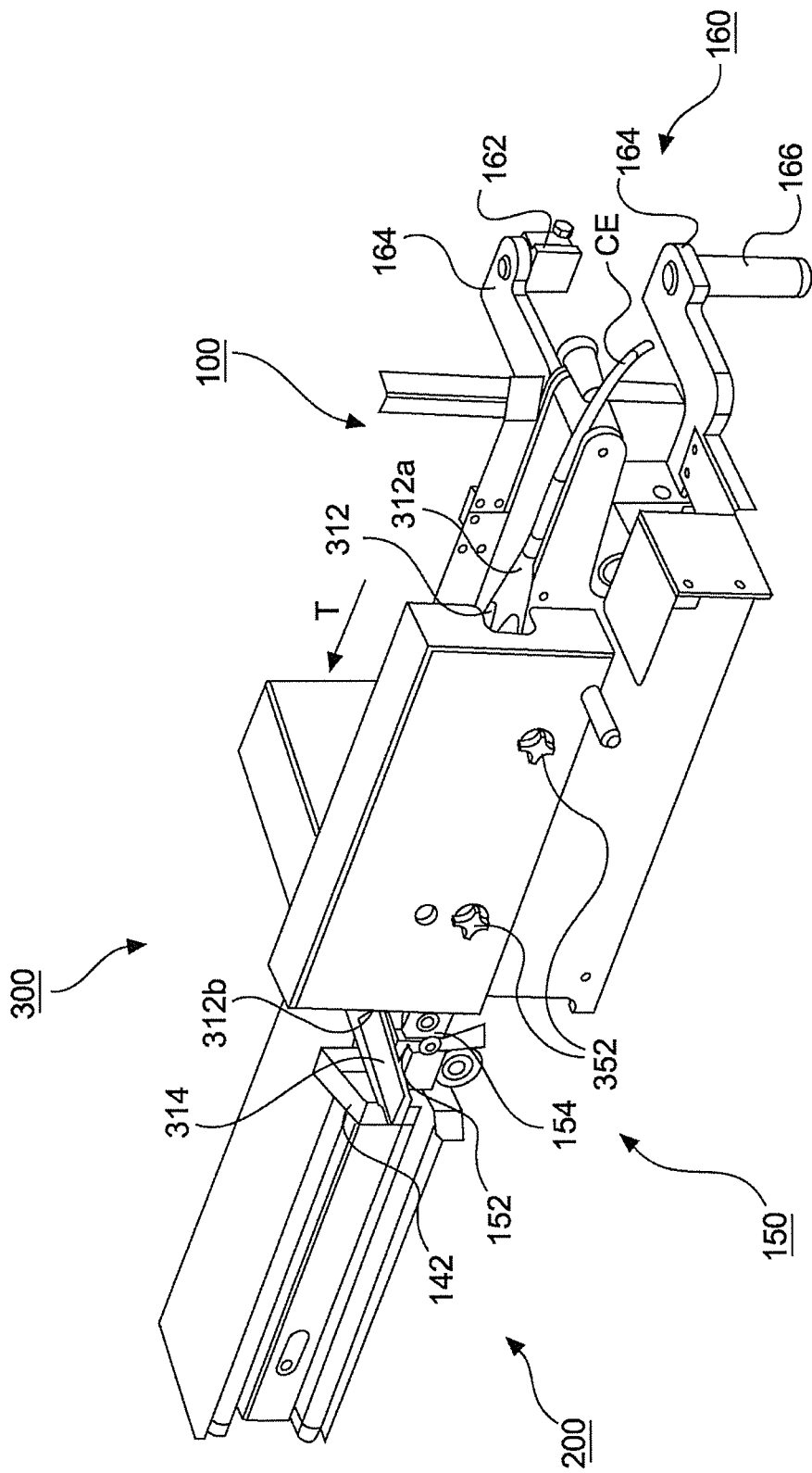
FIG. 9: is a schematic and perspective view to the front side of the discharge device as shown in FIG. 5, with a catching device.

As can be seen in FIG. 9, catching device 300 is attached to the front side of conveyor means 100 and extend approximately parallel thereto in transportation direction T.

Catching device 300 comprises a guide mechanism 310 which includes a guide element 312 in the form of an approximately horizontally arranged guide bar. Guide element or guide bar 312 has a first end 312a facing towards clipping machine CM and a second end 312b facing in transportation direction T. Guide bar 312 further comprises an angled portion 314 extending from second end 312b in transportation direction T and downwardly in an angle corresponding to the angle of the inclined plane defined by guide roller arrangement 129 (cf. FIG. 10). The downstream end of angled portion 314 forms a first support portion SP1 for supporting one end of rod-like element R positioned in the loading position.

At first end 312a of guide bar 312, a catching element CE in the form of a catching pin is arranged, which has a tip end facing towards clipping machine CM and which extends into the closing region of clipping machine CM in order to catch suspension loop L when attached to sausage-shaped product S (cf. FIG. 2).

Guide bar 312 has an approximately rectangular cross-section with an approximately horizontally arranged upper surface and a lower surface arranged approximately parallel to the upper surface. Each of the upper and lower surfaces of guide bar 312 features two identical recesses 316. Recesses 316 in the upper surface of guide bar 312 are arranged near first and second ends 312a, 312b of guide bar 312, respectively. Recesses 316 in the lower surface of guide bar 312 are aligned vertically below recesses 316 in the upper surface. Recesses 316 extend in the longitudinal direction of guide bar 312 and have the shape of the segment of a circle. Recesses 316 have an approximately V-shaped cross section with a rounded apex.

Catching device 300 further comprises four identical support units 320 for supporting guide bar 312. Each support unit 320 includes two circular plate elements 322 arranged parallel to each other and on a common axle 324 by means of which plate elements or plates 322 are rotatably supported. Plates 322 are vertically arranged with their axles 324 extending perpendicularly to transportation direction T.

Between each pair of plates 322, five rollers 326 are arranged with their rotation axes arranged on a concentric circle in vicinity to the outer circumference of plates 322 and parallel to axle 324. Rollers 326 taper towards their outer circumference. A ring 328 of rubber is arranged at the circumference of each roller 326. Ring 328 has a circular cross-section the radius of which corresponds to the radius of the rounded apex of the V-shaped cross-section of recesses 316 (cf. FIG. 11).

Support units 320 may be driven by a drive assembly 330 such that support units 320 rotate about axles 324. A pulley 332 is mounted on each of axles 324 of support units 320. Drive assembly 330 further includes a drive roller 335 and four deflection rollers 326. A drive element in the form of a drive belt 338 is wound about pulleys 334, drive roller 335 and deflection rollers 336 such that support units 320 rotate about their axles 324 in a desired direction. Presently, upper support units 320 rotate in opposite directions whereas lower support units 320 rotate in the same direction about axles 324 (cf. FIG. 10).

Drive roller 335 is mounted on a drive axle 337 extending horizontally drive roller 335 to the rear side of catching unit 300. Drive axle 337 is coaxially aligned with drive axle 134 on which third roller 126 of roller arrangement 120 is mounted and which is driven by motor 132 of conveyor drive 130. The rear end of drive axle 337 is coupled to the front end of drive axle 134 of third roller 126 by a form-fit clutch 340 which has a receiving element 342 in the form of a recess or slot, and an engagement element 344 which form-fit engages the recess in receiving element 342. Receiving element 342 is attached to the front end of drive axle 134 of conveyor drive 130 (cf. FIG. 5) and engagement element 344 is attached to the rear end of drive axle 337 of drive unit 330 of catching unit 300 (cf. FIG. 11) such that drive unit 330 is driven by motor 132 of conveyor drive 130.

Figure 10:
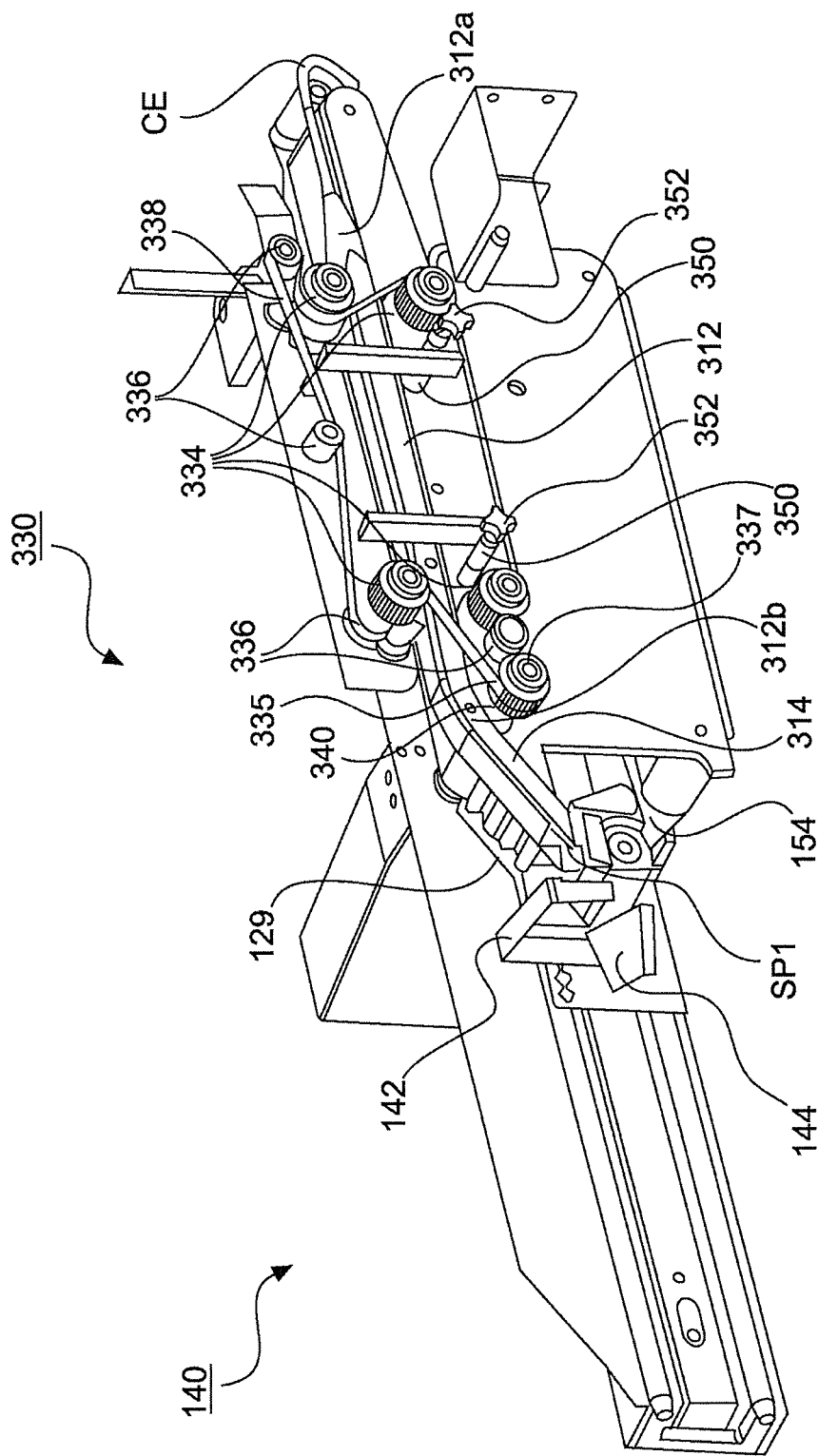
FIG. 10: is a further schematic and perspective view to the front side of the discharge device shown in FIG. 9.

Catching unit 300 is releasable fixed to conveyor means 100 by two fixation screws 350 each including a handle 352 for manually fixing and loosening fixation screws 350 (cf. FIGS. 9, 10). After loosening fixation screws 450, catching unit 300 may be removed from conveyor means 100, thereby engagement element 344 of clutch 340 is withdrawn from receiving element 342 of clutch 340. When attaching catching unit 300 to conveyor means 100, engagement element 344 of clutch 340 engages receiving element 342 such that support units 320 are driven via drive unit 330 by motor 132 of conveyor drive 130.

The two upper support units 320 are positioned such that, at each time point, two rollers 326 of one of the two support units 320 engage the respective recess 316 whereas only one of the rollers 326 of the respective other support unit 320 engages the respective other recess 316. The two lower support units 320 are positioned accordingly. Thus, at each time point during the rotational movement of support units 320, an upper recess 316 and a lower recess 316 is engaged by two rollers 326, whereby guide bar 312 is secured against movement in its longitudinal direction. Furthermore, due to the shape of recesses 316 and the corresponding shape of rollers 326, guide bar 312 is further supported in vertical direction and in horizontal direction rectangular to transportation direction T.

Conveyor means 100 further comprise a retaining mechanism 140 for retaining a sausage-shaped product S just passing second end 104 of conveyor means 100 for preventing uncontrolled tilting of said sausage-shaped product about second roller 122 of roller arrangement 120 (cf. FIGS. 5, 7, 9 and 10). Retaining mechanism 140 includes an approximately U-shaped upper retaining element or retaining bow 142 approximately vertically arranged above second end 102 of conveyor means 100 and across the passage way of a sausage-shaped product S passing second end 104. Retaining bow 142 is arranged with its open side facing downwards, and one leg of U-shaped retaining bow 142 is fixed to second end 246*b* of carrier plate 246 of second slider assembly 240. Retaining mechanism 140 further comprises a guide plate 144 arranged immediately downstream second roller 122 of roller arrangement 120. Guide plate 144 is mounted to second end 246*b* of carrier plate 246 of second slider assembly 240 and below retaining bow 142. Retaining mechanism 140 is thereby fixedly arranged at second end 246*b* of carrier plate 246 of second slider assembly 240, and thus, moves together with second roller 122 of roller arrangement 120 when telescopic device 200 is activated.

Moreover, laterally to second roller 122 of roller arrangement 120, a sensor arrangement 150 is positioned such that it is moved together with second end 104 of conveyor means 100 (cf. FIGS. 5, 7, 9 and 10). Sensor arrangement 150 functions as a product counter which registers a sausage-shaped product S when passing second end 102 of conveyor means 100 for being supplied to rod-like element R. Sensor device or product counter 150 includes a cam-switch 152 which is engaged by suspension loop L of sausage-shaped product S while passing second end 102 of conveyor means 100. Cam switch 152 activates a counter switch 154 which is coupled to the control unit of clipping machine CM.

Sensor arrangement 150 is activated by suspension loop L of sausage-shaped product S just passing second end 104 of conveyor means 100 by acting on cam-switch 152. The signal of sensor device 150 is used to activate telescopic device 200 for retracting second end 104 of conveyor means 100 about a distance corresponding to the distance between two subsequent sausage-shaped products S on rod-like element R. Additionally, the signal of sensor device 150 may also be used for activating an infeed device 400 and an outfeed device 500 of feeding device FD for removing a filled rod-lie element out of the loading position and for feeding an empty rod-like element R into the loading position, which are explained in detail below.

The system for producing sausage-shaped products S as shown in FIGS. 2 to 4 further includes feeding device FD for feeding rod-like elements R into a loading position in which sausage-shaped products are suspended on said rod-like element R which is explained in the following in greater detail in conjunction with FIGS. 12 to 14.

Feeding device FD comprises an infeed device 400 for accommodating or storing a supply of rod-like elements R as a storage, separating a single rod-like element R out of the supply of rod-like elements R and for feeding said separated rod-like element R into the loading position in which sausage-shaped products S are hung up on rod-like element R.

Feeding device FD further comprises an outfeed device 500 for feeding a rod-like element R filled with a predefined number of sausage-shaped products S out of the loading position.

Infeed device 400 and outfeed device 500 are supported on a main frame 600 which has a horizontal frame structure 610 with two parallel frame bars 612 being aligned to transportation direction T in an angle of approximately 90°. Between frame bars 612 two longitudinally extending bars 614 are arranged in transportation direction T. Frame bars 612 form the upstream and downstream ends of main frame 600. Two pairs of vertical posts 620 extend upwardly from frame bars 610. On vertical posts 620, infeed device 400 and outfeed device 500 are supported.

Infeed device 400 comprises a magazine or storage device for accommodating a plurality of rod-like elements R. Magazine device includes an upstream wall 410 and a downstream wall 420 which are arranged parallel to each other and approximately vertically above frame bars 612. The distance between walls 410, 420 corresponds to the length of a rod-like element R. In the surfaces of walls 410, 420 facing each other, vertical slots 412, 422 are arranged parallel to each other. Slots 412, 422 extend from the upper end of walls 410, 420 and commonly end in a funnel-shaped recess 414, 424 (cf. FIG. 13, 14).

Rod-like elements R fed into slots 412, 422 are arranged in transportation direction T such that the upstream end of rod-like element R is accommodated in one of slots 412 and the downstream end of rod-like element R is accommodated in the respective slot 422 arranged opposite to slot 412 in which the upstream end of rod-like element R is accommodated.

Releasing means 430 are provided for blocking the rod-like elements R positioned in slots 412, 422, and for selectively releasing a single rod-like element R from one of slots 412, 422 at the lower ends of slots 412, 422. Releasing means 430 include first blocking and releasing elements 432 in the form of release pins which extend into slots 412, 422, and which may reversibly be moved out of slots 412, 422 for selectively releasing a single rod-like element out of slots 412, 422 into funnel-shaped recesses 414, 424.

At the lower end of each funnel-shaped recess 414, 424, a single slot 416, 426 is arranged into which single rod-like element R is moved after being selectively released from slots 412, 422. Recesses 416, 426 provide a standby position in which a single, empty rod-like element R is kept ready for being fed into the loading position after a filled rod-like element R has been removed out of the loading position.

Immediately below single slots 416, 426, second blocking and releasing elements 434 in the form of release pins are arranged for securing a single rod-like element R in the standby position, and for releasing rod-like element R into the loading position.

First and second blocking and releasing elements 432, 434 are actuated via an actuation mechanism 436 which may include pneumatic or electric actuation means for reversibly moving first and second blocking and releasing elements 432, 434, like releasing pins, into slots 412, 422, 416, 426, in order to block or release a rod-like element R.

Releasing means 430 are coupled to the control unit of clipping machine CM for being controlled in accordance with the production process.

Wall 410 ends below release elements 434, whereas wall 420 further extends downwardly. In the portion of wall 420 extending below slot 426, an approximately V-shaped recess 428 is arranged with the leg of the V facing to the rear side of feeding device FD being arranged vertically and aligned with the rearward facing side of slot 426 such that a rod-like element R being released by second release elements 434 and falling downwardly, is caught by the apex of V-shaped recess 428 which provides a second support portion SP2 for the downstream end of rod-like element R when in the loading position. The second leg of the V-shape of recess 428 faces to to front side of feeding device FD and provides an opening thereto through which a rod-like element R may be removed out of the loading position, as it will be explained in detail below.

As explained in conjunction with FIG. 10, the downstream end of angled portion 314 of guide bar 110 forms first support portion SP1 for supporting one end, namely the upstream end of rod-like element R positioned in the loading position.

It has to be understood that, in the inventive production system, feeding device FD is arranged relative to discharge device DD such that a rod-like element R when positioned in the loading position, is supported at its upstream end by first support portion SP1 and at its downstream end by second support portion SP2.

At the upper ends of walls 410, 420, a delivery arrangement 440 is provided with an approximately horizontally extending bottom 442 of rectangular shape which is surrounded by a vertically upwards extending rim 444. In bottom 442, slots are arranged which extend in transportation direction T and the ends of which correspond with slots 412, 422 in walls 410, 4220. Rod-like elements R manually inserted by an operator into delivery arrangement 440, may fall vertically downwards into slots 412, 422, and be stored there.

Figure 13:
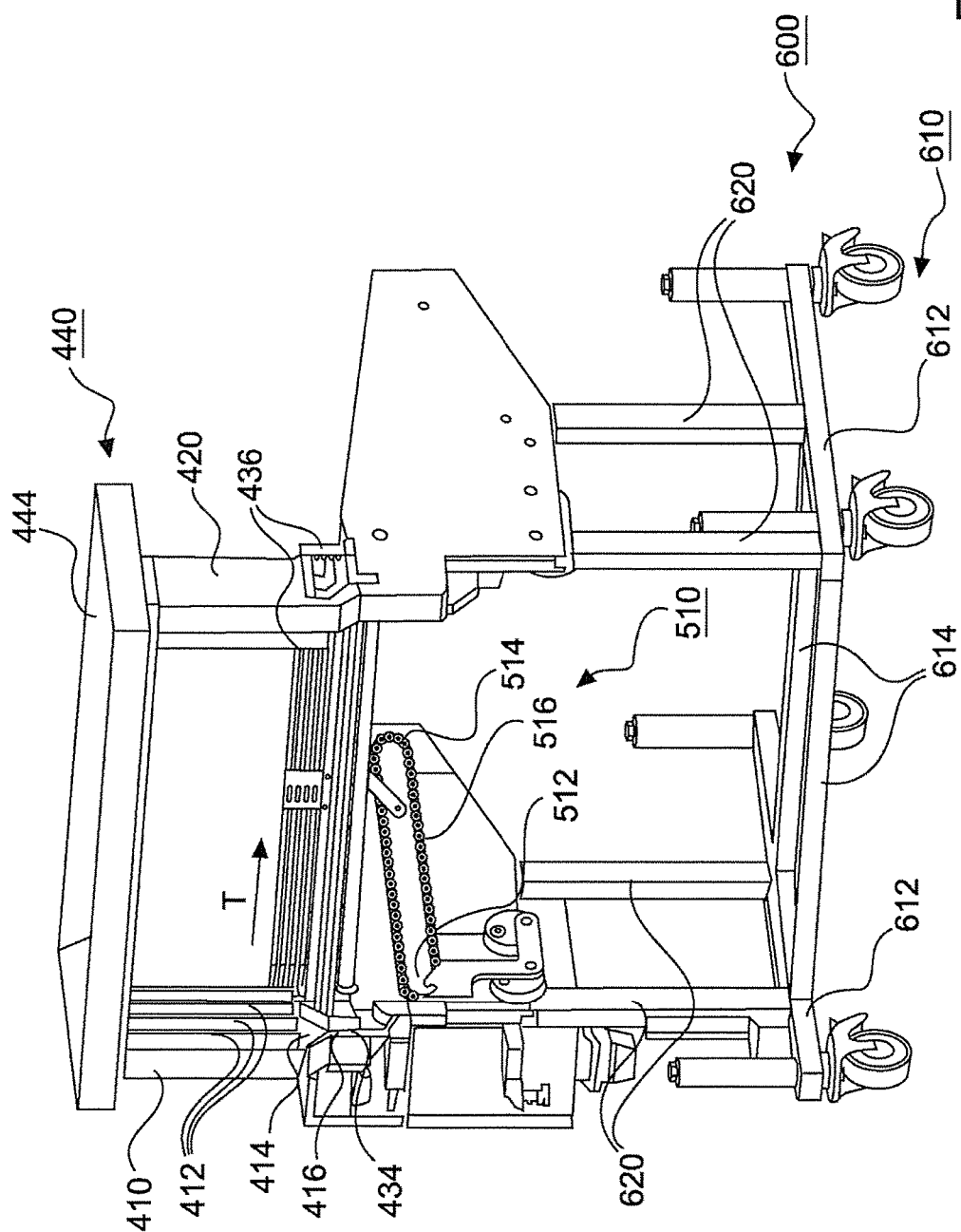
FIG. 13: is a further schematic and perspective view to the rear side of the feeding device of the system shown in FIG. 12.
Figure 14:
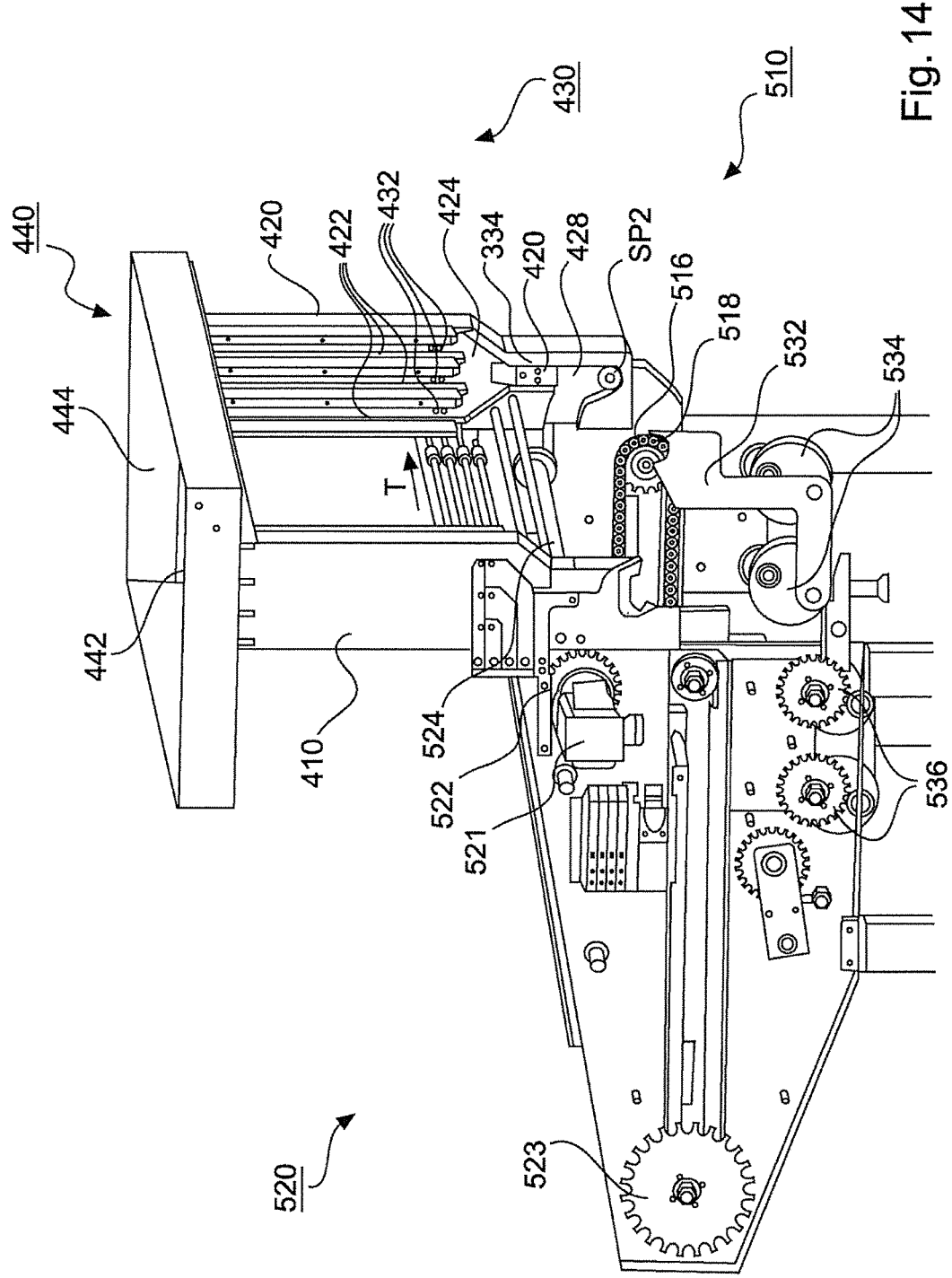
FIG. 14: is an elevated schematic and perspective view to the rear side of the feeding device of the system shown in FIG. 12.

Outfeed device 500 for feeding a rod-like element R filled with a predefined number of sausage-shaped products S out of the loading position includes two horizontally aligned outfeed conveyors 510 in the form of chain conveyors with a first end 512 facing towards the loading position, a second end 514 being directed towards the front side of feeding device FD and in an angle of approximately 90° to transportation direction T and a conveyor element 516, like a conveyor chain, which is wound about guide rollers 518, like sprocket wheels, arranged at first and second ends 512, 514 of conveyors 510 (cf. FIGS. 12 to 14). The upper run of conveyors 510 is at least approximately horizontally aligned with the loading position. Conveyors 510 are in line arranged with first and second support positions SP1, SP2.

An outfeed conveyor drive device 520 is provided for synchronously driving outfeed conveyors 510. Drive device 520 includes a drive means 521, like an electric motor, including a drive wheel 522, a sprocket wheel 523 arranged on a common axle with guide rollers 518 at second end of outfeed conveyors 510 and a transmission element, like a drive chain (not shown). Outfeed conveyor drive device 520 further includes a common drive axle 524 for synchronously commonly driving outfeed conveyors 510, which is coupled with one end to drive chain of one of outfeed conveyors 510 and with the other end to the drive chain of the respective other outfeed conveyor 510.

Outfeed device 500 further comprises a transfer mechanism 530 for transferring a rod-like element R filled with sausage-shaped products S from the loading position into an outfeed position on outfeed conveyors 510.

Transfer mechanism 530 includes two approximately L-shaped transfer elements 532 each with a vertically extending leg and an approximately C-shaped receiving opening at its upper end. The second leg of L-shaped transfer element 532 extends from the lower end of the vertical leg towards the front side of feed device FD and is excentrically coupled to an excenter drive including two excenter discs 534. L-shaped transfer elements 532 are arranged vertically, parallel to each other and in an angle of approximately 90° to transportation direction T. Each transfer element 532 is aligned with one of the ends of a rod-like element R such that said rod-like element R may be engaged by transfer element 532, transferred to outfeed conveyors 510 and put on conveyor chains 516 by its ends.

Excenter discs 534 are driven via drive motor 521 of outfeed conveyor drive device 520 the drive chain of which is also wound about sprocket wheels 536 which are coupled to excenter discs 534. Due to the excentric movement of excenter discs 534, the receiving opening in the upper end of transfer elements 532 moves on a circular path such that a rod-like element R in the loading position is engaged by the receiving opening of transfer element 532 from below, lifted upwardly, transferred to outfeed conveyors 510 and put on conveyor chains 516. Transfer elements 532 with the receiving opening further move downwardly for disengaging rod-like element R positioned on conveyor chains 516, and move back into a starting position shown in FIG. 14.

The size of drive wheel 522, sprocket wheels 523 and sprocket wheels 536 is selected such that during one rotation cycle of transfer element 532 conveyor chains 516 of outfeed conveyors are moved about a distance corresponding to the distance between two rod-like elements R placed on outfeed conveyors 510.

The system for producing sausage-shaped products as shown in FIGS. 2 to 4 includes amongst others clipping machine CM, discharge device DD and feeding device FD.

Discharge device DD is coupled to clipping machine CM such that first end 102 of conveyor means 100 is aligned with discharge opening 50 of clipping machine CM when in the working position or discharge position as shown in FIGS. 2 and 3. Coupling means 160 in the form of a hinge are provided for arranging discharge device DD to clipping machine CM. Coupling means or hinge 160 includes first hinge portions 162 mounted to clipping machine CM and second hinge portions 164 in the form of angled levers are fixedly attached to discharge device DD. Second hinge portions or angled levers 164 are arranged horizontally and vertically above each other.

Figure 8:
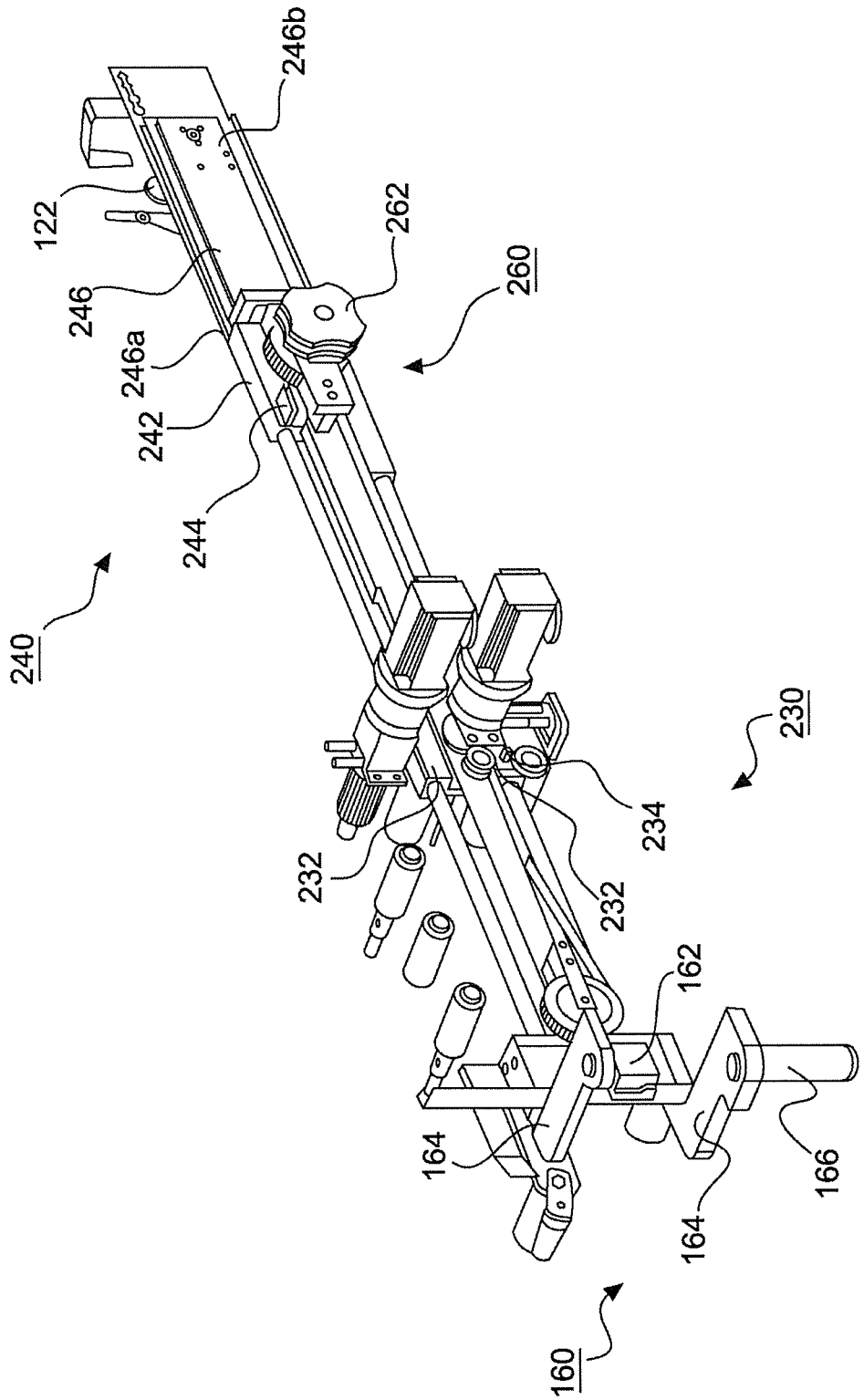
FIG. 8: is a schematic and perspective view to the rear side of the discharge device as shown in FIG. 7.

In FIGS. 6, 8 and 9, only one first hinge portion 162 is shown. The free end of upper angled lever 164 is connected with the upper one of first hinge portions 162. At the free end of lower angled lever 164, a vertically arranged hinge bolt 166 extends downwardly. Hinge bolt 166 engages the lower hinge portion at clipping machine CM which includes a hole (not shown) for receiving hinge bolt 166.

By means of coupling means 160, discharge device DD may be mounted to clipping machine CM and reversibly pivoted about hinge bolt 166 in a horizontal plane between a working position as shown in FIGS. 2 and 3 and an inoperative position as shown in FIG. 4. In the inoperative position, discharge device DD is pivoted out of transportation direction T, e.g. for maintenance or cleaning of the production system.

As further can be seen in FIGS. 2 to 3, feeding device FD is coupled to clipping machine CM by a coupling mechanism 630 which includes two coupling bars 632, 634. Coupling bars 632, 634 are pivotally attached with their downstream ends to upstream frame bar 612 of main frame 600 of feeding device FD. The upstream ends of coupling bars 632, 634 are pivotally mounted to the frame of clipping machine CM. Coupling bars are arranged horizontally and parallel to each other. The length of coupling bars 632, 634 is selected such that feeding device FD, and in particular first and second support portions SP1, SP2, are aligned in transportation direction T and with a distance there between which corresponds to the length of a rod-like element R. Additionally, a fixing device (not shown) is provided for fixing feeding device FD at least in its position when aligned in transportation direction T with clipping machine CM.

Figure 11:
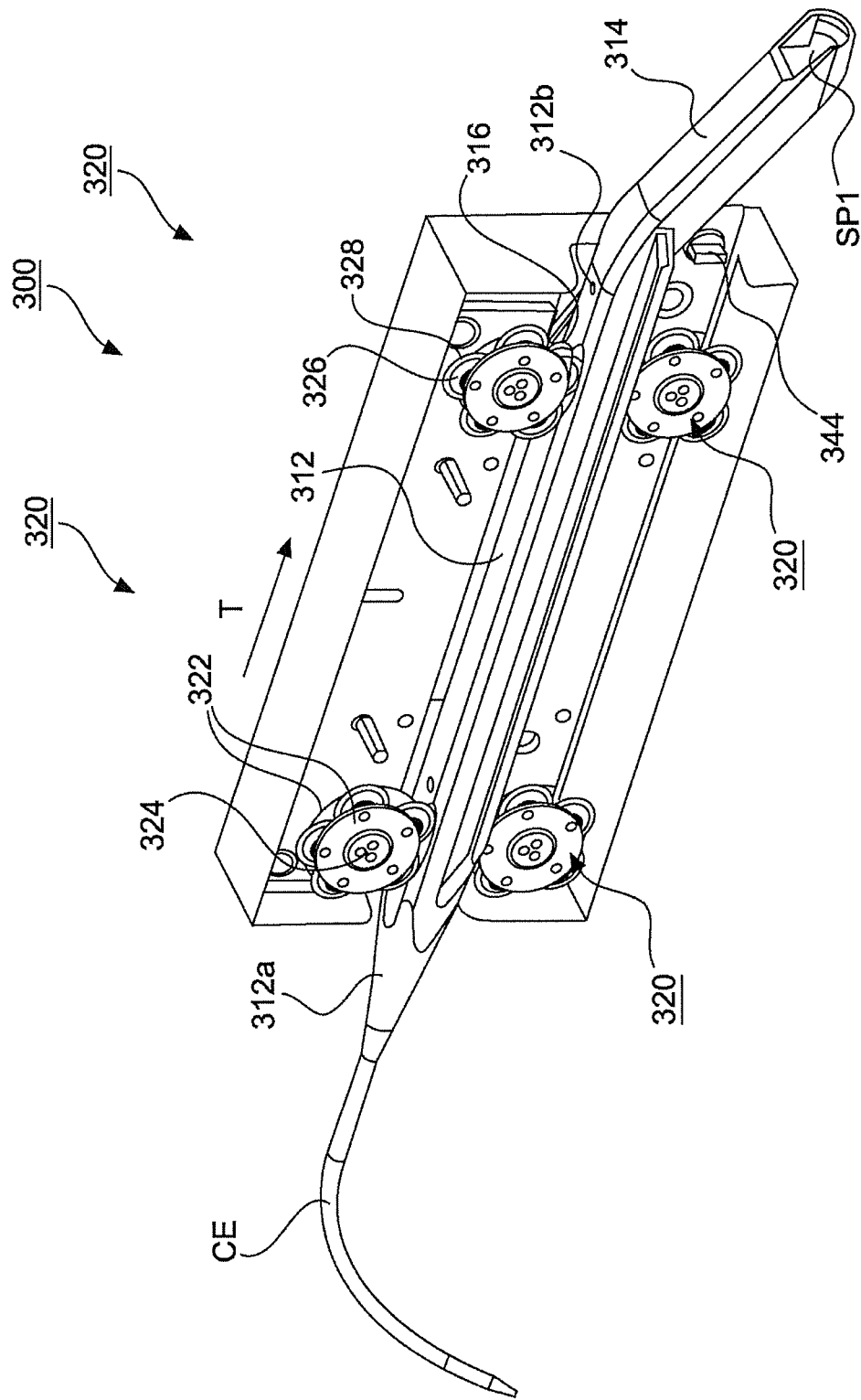
FIG. 11: is a schematic and perspective view to the rear side of the catching device shown in FIG. 9.

As explained in conjunction with FIGS. 9 to 11, catching unit 300 may reversibly attached to conveyor means 100 by two fixation screws 350, whereby engagement element 344 of clutch 340 arranged at catching unit 300 engages receiving element 342 of clutch 340 at conveyor means 100 such that support units 320 are driven by conveyor drive 130.

Figure 15:
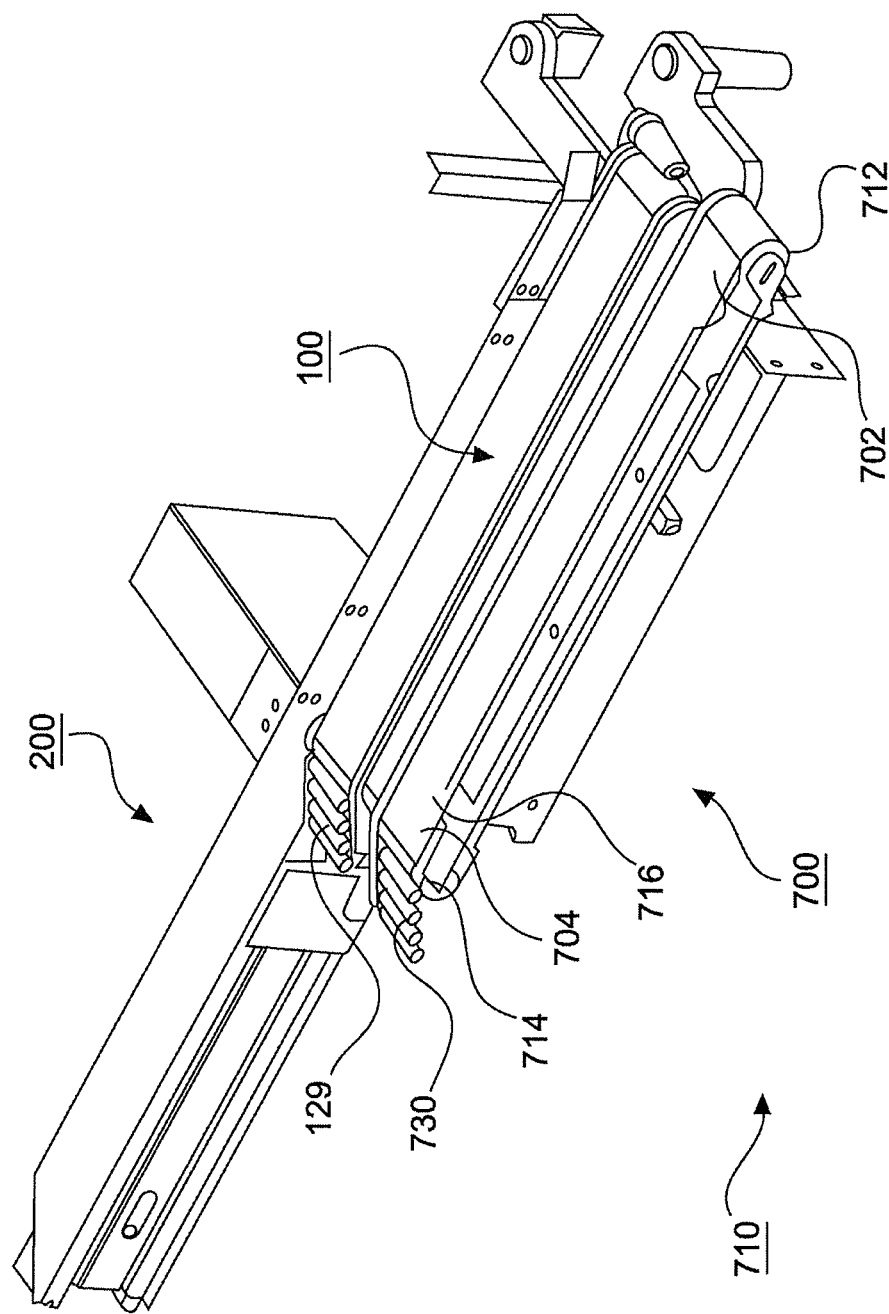
FIG. 15: is a schematic and perspective view to the front side of a further embodiment of the discharge device according to the present invention.
Figure 16:
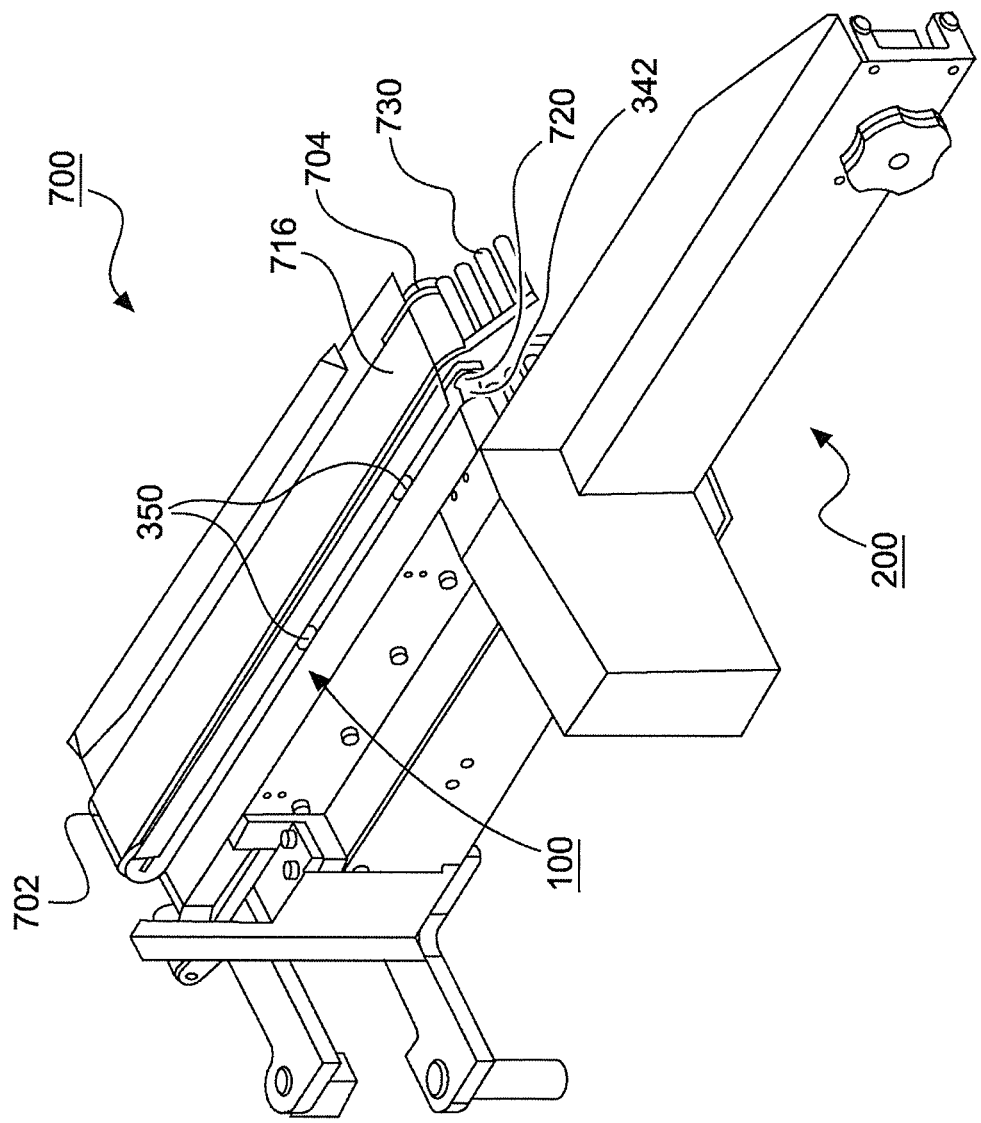
FIG. 16: is a schematic and perspective view to the rear side of the discharge device shown in FIG. 15.
Figure 17:
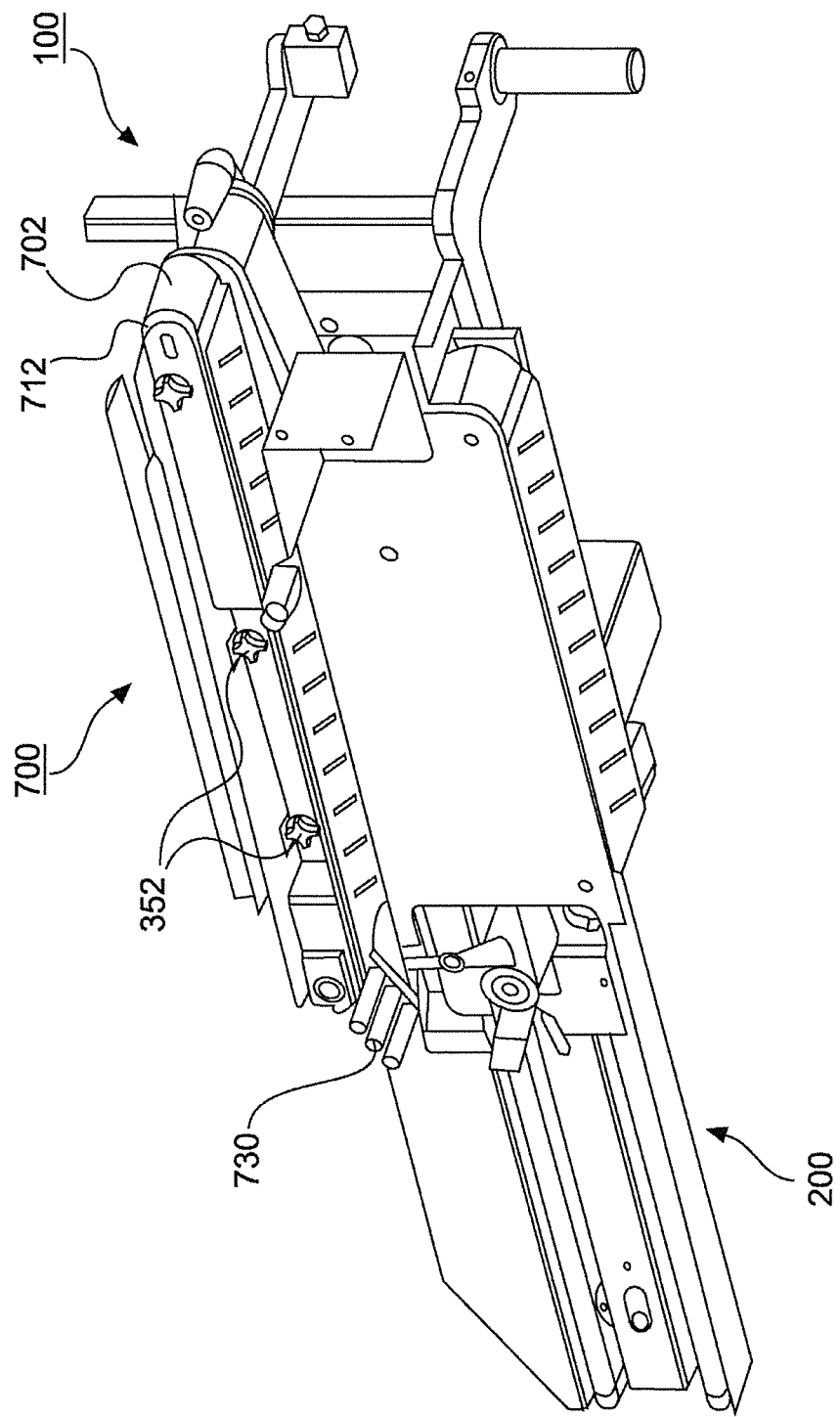
FIG. 17: is a schematic and perspective view to the lower side of the discharge device shown in FIG. 15.

Alternatively, after catching device 300 has been removed from drive means 100, a further discharge conveyor 700 may reversibly be mounted to conveyor means 100 by fixation screws 350 (cf. FIGS. 15 to 17). Discharge conveyor 700 has a first end 702 and a second end 704, a conveyor mechanism 610 with a first deflection roller 712 at first end 702, a second deflection roller 714 at second end 704 and a conveyor belt 716 wound about deflection rollers 712, 714. Conveyor mechanism 710 is driven via a drive axle 718 on which deflection roller 714 is mounted. At the rear side of drive axle 716, i.e. that side facing towards conveyor means 100, an engagement element 720 is attached which is identical with engagement element 344 of clutch 340, and which engages receiving element 342 of clutch 340 for providing a form-fit coupling of drive axle 716 with conveyor drive 130. Deflection roller 714 is thereby coaxially arranged with third roller 126 of roller arrangement 120 of conveyor means 100, and positioned laterally thereto.

Discharge conveyor 700 further comprises a guide roller arrangement 730 which is identically designed as guide roller arrangement 129 of conveyor means 100. Guide roller arrangement 730 is positioned side by side to guide roller arrangement 129.

By means of reversibly attachable of discharge conveyor 700, the width of conveyor means 100 may be increased, e.g. in adaption to the size or kind of products to be produced.

For producing sausage-shaped products S, filling material is fed through filling tube 10 into tubular packaging casing material M which is closed at its front end by a closure clip C. Filled tubular packaging casing material M is gathered by gathering means 30, a plait-like portion is formed thereto and a closure clip C for closing the filled tubular packaging casing material M is applied to the plait-like portion, forming a sausage-shaped product S. Together with closure clip C, a suspension loop L is attached to the closed end of sausage-shaped product S.

Before starting the production of sausage-shaped products, rod-like elements R are placed in feeding device FD with a supply of rod-like elements R in slots 412, 422 of walls 410, 420. A single rod-like element is released from one of slots 412, 422 to be positioned in the standby position in recesses 416, 426 and one rod-like element R positioned in the loading position on support portions SP1, SP2.

Figure 7:
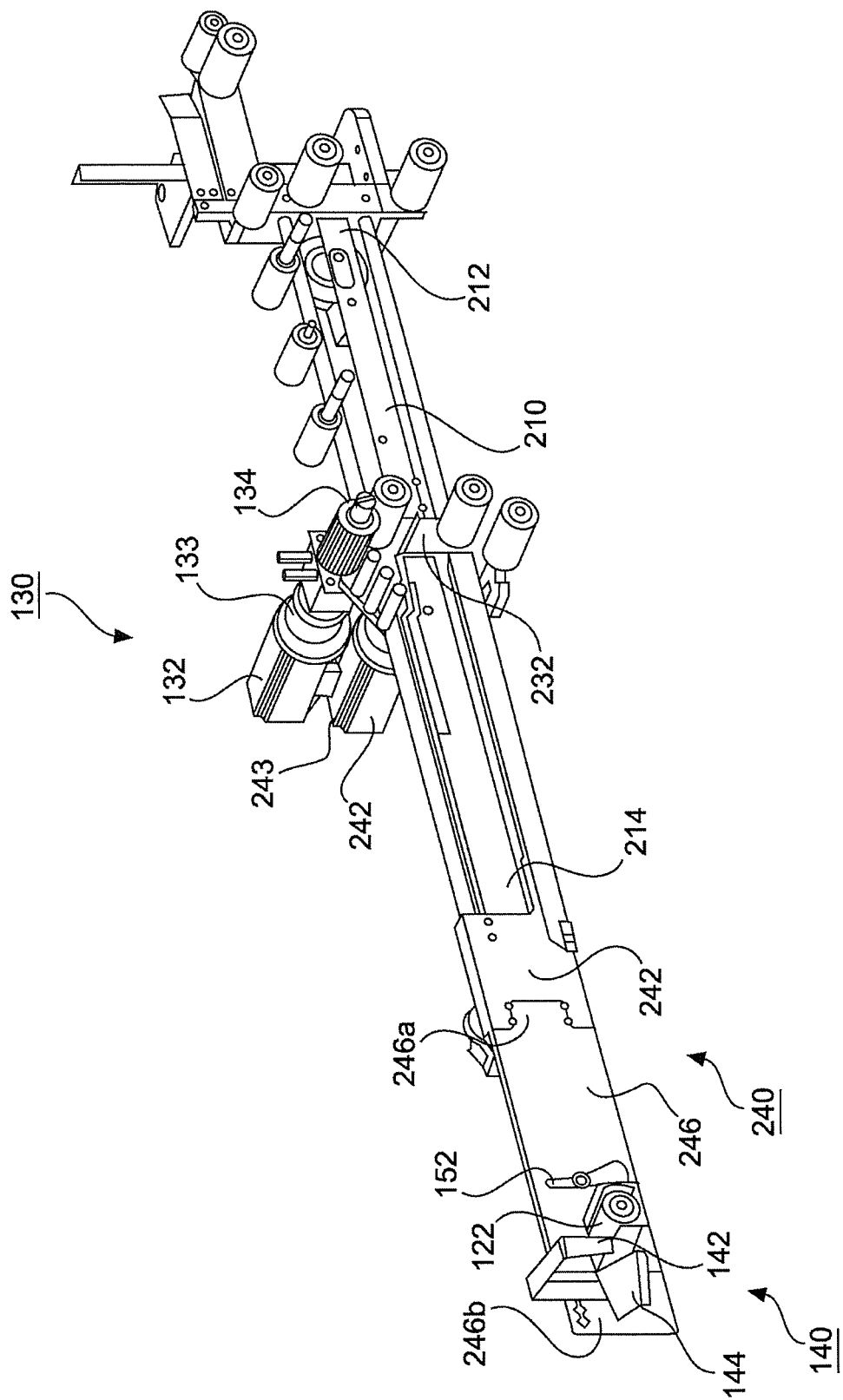
FIG. 7: is a schematic and perspective view to the front side of the discharge device as shown in FIG. 5, with the telescopic device in the elevated position.

Discharge device DD is positioned in its working position, and telescopic device 200 is in its fully extended position with second end 104 of conveyor means 100 in closed vicinity to the downstream end of rod-like element R provided in the loading position (cf. FIG. 7).

Sausage-shaped product S is discharged from clipping machine CM by discharge device DD. The sausage-shaped body of sausage-shaped product S is received and moved in transportation direction T by conveyor means 100, whereas suspension loop L is caught by catching element CE of catching device 300 and guided along guide bar 312.

The sausage-shaped body of sausage-shaped product S is further transported in transportation direction T, and suspension loop L is transferred along angled portion 314 of guide bar 312, passing upstream end of rod-like element R halt in support portion SP1 and is further transferred along rod-like element R in transportation direction T.

Second end 104 of convenor means 100 is arranged such that sausage-shaped product S when leaving conveyor means 100 at its second end 104, is suspended on rod-like element R at downstream most position. When leaving second end 104 of conveyor means 100, suspension loop L acts on product counter 250 which sends a signal to control unit of clipping machine CM or a central control unit controlling the production system.

Thereafter, telescopic device 200 retracts second end 104 about a selected distance which corresponds to the distance between two subsequent sausage-shaped products to be stored on rod-like element R. Accordingly, the next sausage-shaped product produced and discharged from clipping machine CM is unloaded from discharge device DD and placed on rod-like element R at a position in a selected distance upstream to the previously suspended sausage-shaped product S. When suspending the last sausage-shaped product S on rod-like element R in the loading position, telescopic device 200 is in its fully retracted position (cf. FIG. 6).

A sausage-shaped product S leaving second end 104 of conveyor means 100 passes retaining mechanism 140 through approximately U-shaped retaining bow 142. Retaining bow 142 prevents the sausage-shaped product S from uncontrolled tilting about second end 104 of conveyor means 100, and guide plate 144 guides the sausage-shaped body of sausage shaped-product downwardly. Suspension loop L is guided between the free leg of U-shaped retaining bow 142 and guide plate 144, whereby an uncontrolled movement of suspension loop L when sausage-shaped product S finally leaves conveyor means 100 is prevented. Accordingly, a correct positioning of sausage-shaped product S on rod-like element R is ensured.

The signal is used for registering the number of sausage-shaped products stored on rod-like element R in the loading position and for activating infeed device 400 and outfeed device 500 for removing the filled rod-like element R from the loading position and for feeding an empty rod-like element R into the loading position. Additionally, the signal of product counter 250 is also used for activating telescopic device 200, in order to move second end 104 of conveyor means 100 to the next storage place on rod-like element R in the loading position and, after being retracted in the fully retracted position which is reached after a rod-like element R has been filled with sausage-shaped products S, to move second end 104 of conveyor means 100 into the fully extended position.

For removing filled rod-like element R from the loading position, transfer mechanism 530 is activated such that L-shaped transfer elements 532 engage rod-like element R in the loading position and transfer said rod-like element R onto conveyor chains 516 of outfeed conveyors 510. During the further movement of transfer elements 532, conveyor chains 516 are moved towards the front side of feeding device FD about a predefined distance.

Immediately after filled rod-like element R is removed from the loading position, the rod-like element R provided in the standby position is released and may fall into the loading position. A further rod-like element R is released from one of slots 412, 422 and may move into the standby position.

At the same time, telescopic device 200 is moved into its fully extended state with second end 104 of conveyor means 100 is positioned closed to the downstream end of rod-like element R positioned in the loading position.

It has to be understood that discharge device DD with conveyor means 100 and telescopic device 200 and feeding device FD with infeed device 400 and outfeed device 500 are coupled to the control unit of clipping machine CM for commonly and synchronously be controlled during the production process.

Alternatively, a separate control unit may be provided for commonly an synchronously controlling all components of the production system, and to which the component, clipping machine CM, discharge device DD and feeding device FD are connected.

What is claimed is:

1. A system for producing sausage-shaped products containing a flowable filling material in a tubular or bag-shaped packaging casing and a suspension loop, the system includes a clipping machine for producing the sausage-shaped products, a discharge device for discharging the sausage-shaped products out of the clipping machine and a feeding device for feeding a rod-like element into a loading position in which the sausage-shaped products are adapted to be stored by their suspension loops on the rod-like element directly by the discharge device.

2. The system according to claim 1,
wherein the clipping machine comprises a filling tube on which the tubular or bag-shaped packaging casing is stored and through which filling material is fed in a feeding direction into the tubular or bag-shaped packaging casing, gathering means for gathering the filled tubular or bag-shaped packaging casing and for forming a plait-like portion thereto and a clipping device for applying at least one closure means, like a closure clip, to the plait-like portion for closing the just filled portion of the tubular or bag-shaped packaging casing and for applying a suspension element, like a suspension loop, thereto.

3. The system according to claim 1,
wherein the discharge device comprises a conveyor means having a first and a second end with the first end directed to the clipping machine and the second end directed in feeding direction, a catching device for catching the suspension element of the sausage-shaped product and for guiding the suspension element in feeding direction, and a telescopic device for reversibly moving the second end of the conveyor means in the feeding direction.

4. The system according to claim 3,
wherein the discharge device further comprises at least one drive means for driving the conveyor means and the telescopic device.

5. The system according to claim 4,
wherein the drive means include a first drive device for driving the conveyor means and a second drive device for driving the telescopic device.

6. The system according to claim 3,
wherein the telescopic device includes a base assembly, a first slide assembly reversibly movable relative to the base assembly in the feeding direction and a second slide assembly reversibly movable relative to the first slide assembly in the feeding direction.

7. The system according to claim 3,
wherein the catching device is removably attached to the conveyor means.

8. The system according to claim 3,
wherein the feeding device is positioned such that the second end of the conveyor means of the discharge device may reversibly be moved along the rod-like element provided by the feeding device in the loading position.

9. The system according to claim 1,
wherein the feeding device comprises a feeding mechanism for feeding a single rod-like element into a loading position in which the sausage-shaped products are hung up by their suspension elements onto said rod-like element.

10. The system according to claim 1,
wherein the discharge device further includes a release mechanism for reversibly releasing the conveyor element from the conveyor means.

11. The system according to claim 1,
wherein the feeding device includes a storage for accommodating a supply of rod-like elements.

12. The system according to claim 11,
wherein the feeding device further includes separation and delivering means for separating a single rod-like element from the supply of rod-like elements and delivering said single rod-like element towards the loading position.

13. The system according to claim 1,
wherein the discharge device includes a first support element for supporting one end of the rod-like element provided in the loading position, and wherein the feeding device includes a second support element for supporting the second end of the rod-like element provided in the loading position.

14. A method for controlling a system for producing sausage-shaped products containing a flowable filling material in a tubular or bag-shaped packaging casing and a suspension loop, the system includes a clipping machine for producing the sausage-shaped products, a discharge device for discharging the sausage-shaped products out of the clipping machine and a feeding device for feeding a rod-like element into a loading position, the method comprises the steps of:
providing a tubular or bag-shaped packaging casing on a filling tube of the clipping machine,
feeding filling material into the tubular or bag-shaped packaging casing closed at its front end,
gathering the filled tubular or bag-shaped packaging casing,
applying at least one closure clip to the gathered portion of the filled tubular or bag-shaped packaging casing,
attaching a suspension element, like a suspension loop, thereto,
discharging the sausage-shaped product form the clipping machine and
suspending the sausage-shaped product by their suspension loops on a rod-like element provided in a loading position directly by the discharge device.

15. The method according to claim 14,
wherein the discharge device comprises a conveyor means having a first and a second end with the first end directed to the clipping machine and the second end directed in feeding direction, a catching device for catching the suspension element of the sausage-shaped product and for guiding the suspension element in feeding direction, and a telescopic device, further comprising the step of:
reversibly moving the second end of the conveyor means in the feeding direction.

* * * * *